US011899962B2

(12) United States Patent
Esaka et al.

(10) Patent No.: US 11,899,962 B2
(45) Date of Patent: Feb. 13, 2024

(54) INFORMATION PROCESSING APPARATUS

(71) Applicant: Kioxia Corporation, Tokyo (JP)

(72) Inventors: Naoki Esaka, Kawasaki (JP); Koichi Nagai, Ota (JP); Toyohide Isshi, Kawasaki (JP)

(73) Assignee: Kioxia Corporation, Tokyo (JP)

(*) Notice: Subject to any disclaimer, the term of this patent is extended or adjusted under 35 U.S.C. 154(b) by 162 days.

(21) Appl. No.: 17/653,393

(22) Filed: Mar. 3, 2022

(65) Prior Publication Data
US 2023/0070397 A1    Mar. 9, 2023

(30) Foreign Application Priority Data
Sep. 6, 2021    (JP) .................. 2021-144701

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| 7,870,350 | B1* | 1/2011 | Yu ........................ G06F 13/161 |
| | | | 711/155 |
| 9,977,740 | B2 | 5/2018 | Hayakawa et al. |
| 10,468,077 | B2* | 11/2019 | Chagam Reddy .... G06F 3/0616 |
| 10,649,898 | B2* | 5/2020 | Kim ..................... G06F 13/1673 |
| 11,011,243 | B2 | 5/2021 | Lee et al. |
| 11,016,905 | B1 | 5/2021 | Manzanares et al. |
| 2010/0332776 | A1* | 12/2010 | Uchikado ........... G06F 11/2064 |
| | | | 709/213 |

(Continued)

FOREIGN PATENT DOCUMENTS

| JP | 2016-133976 A | 7/2016 |
| JP | 6414853 B2 | 10/2018 |

(Continued)

OTHER PUBLICATIONS

Shuo-Han Chen, et al., "A Partial Page Cache Strategy for NVRAM-Based Storage Devices," IEEE Transactions on Computer-Aided Design of Integrated Circuits and Systems, vol. 39, No. 2, Feb. 2020, pp. 373-386.

*Primary Examiner* — William E. Baughman
(74) *Attorney, Agent, or Firm* — Oblon, McClelland, Maier & Neustadt, L.L.P.

(57) ABSTRACT

According to one embodiment, an information processing apparatus includes a nonvolatile memory and a CPU. The CPU stores first data in the nonvolatile memory, performs a first transmission of a write request associated with the first data to the memory system, and stores management data including information equivalent to the write request in the nonvolatile memory. In response to receiving a first response to the write request transmitted in the first transmission, the CPU adds, to the management data, information indicating that the first response has been received. The CPU deletes the first data and the management data in response to receiving a second response to the write request transmitted in the first transmission after receiving the first response.

20 Claims, 26 Drawing Sheets

(56) References Cited

U.S. PATENT DOCUMENTS

| | | |
|---|---|---|
| 2016/0210066 A1 | 7/2016 | Yamaura et al. |
| 2017/0168951 A1* | 6/2017 | Kanno .................... G06F 3/061 |
| 2018/0232395 A1* | 8/2018 | Deshmukh ............ G06F 3/0643 |
| 2019/0042460 A1 | 2/2019 | Trika et al. |
| 2019/0179567 A1* | 6/2019 | Kanno ................. G06F 3/0679 |
| 2019/0196728 A1* | 6/2019 | Feng ....................... G06F 3/067 |
| 2020/0089407 A1 | 3/2020 | Baca et al. |
| 2021/0064520 A1 | 3/2021 | Kanno |
| 2021/0081120 A1* | 3/2021 | Iwai ..................... G06F 3/0679 |
| 2021/0223994 A1 | 7/2021 | Kanno et al. |
| 2022/0113909 A1* | 4/2022 | Shin ..................... G06F 3/0659 |
| 2022/0334775 A1* | 10/2022 | Stotski ................. G06F 3/0644 |
| 2023/0070397 A1 | 3/2023 | Esaka et al. |

FOREIGN PATENT DOCUMENTS

| | | |
|---|---|---|
| JP | 2019-105873 A | 6/2019 |
| JP | 2023-37883 A | 3/2023 |
| KE | 2021-114038 A | 8/2021 |

\* cited by examiner

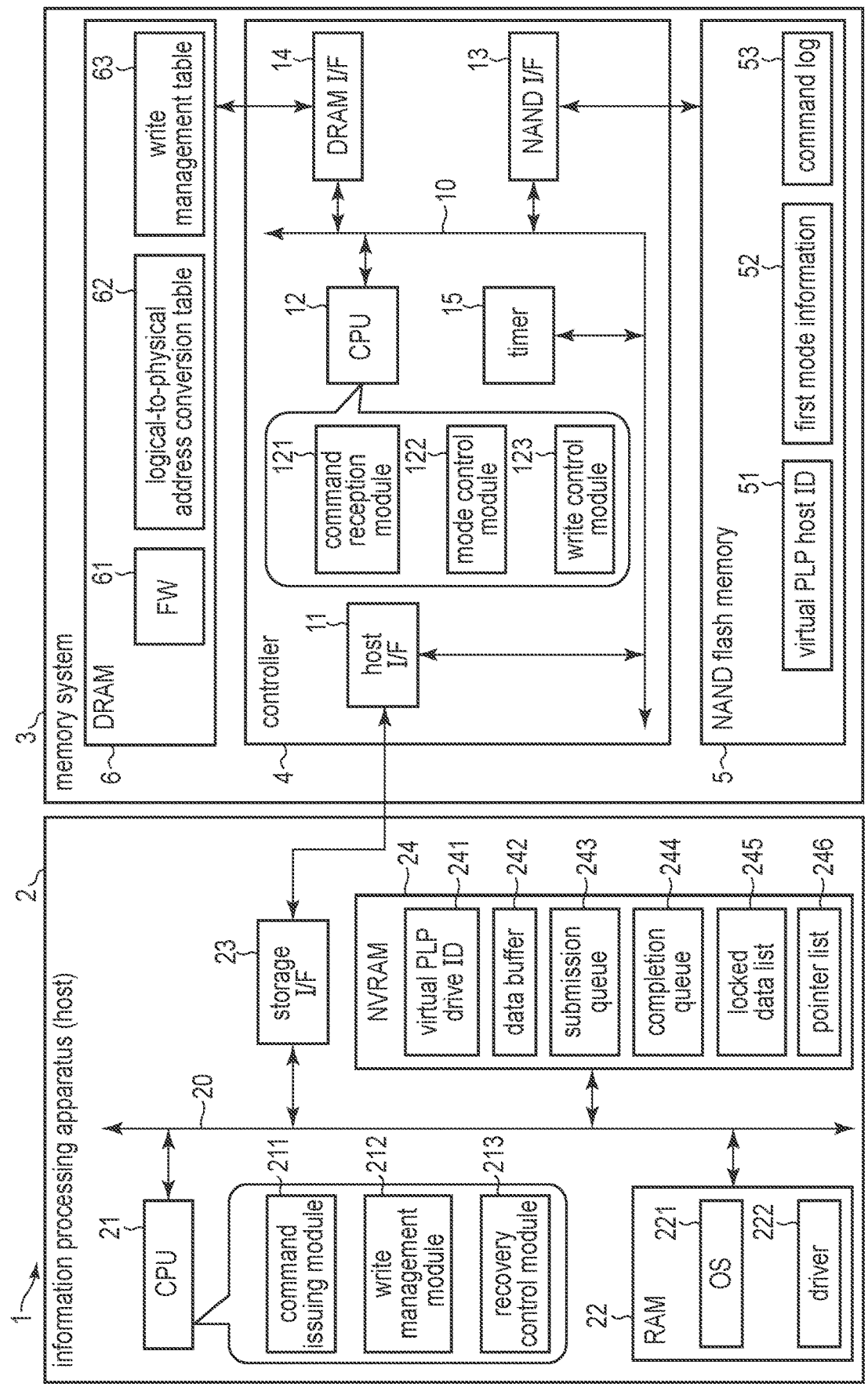
F I G. 1

| SQ entry information | completion order | data region management information | completion state |
|---|---|---|---|
|  |  |  |  |
|  |  |  |  |
|  |  |  |  |

FIG. 2

| LBA | physical address |
|---|---|
| 0 | X |
| 1 | Y |
| 2 | Z |
| ... | ... |

FIG. 3

| command ID | LBA | data length | data pointer |
|---|---|---|---|
|  |  |  |  |

FIG. 4

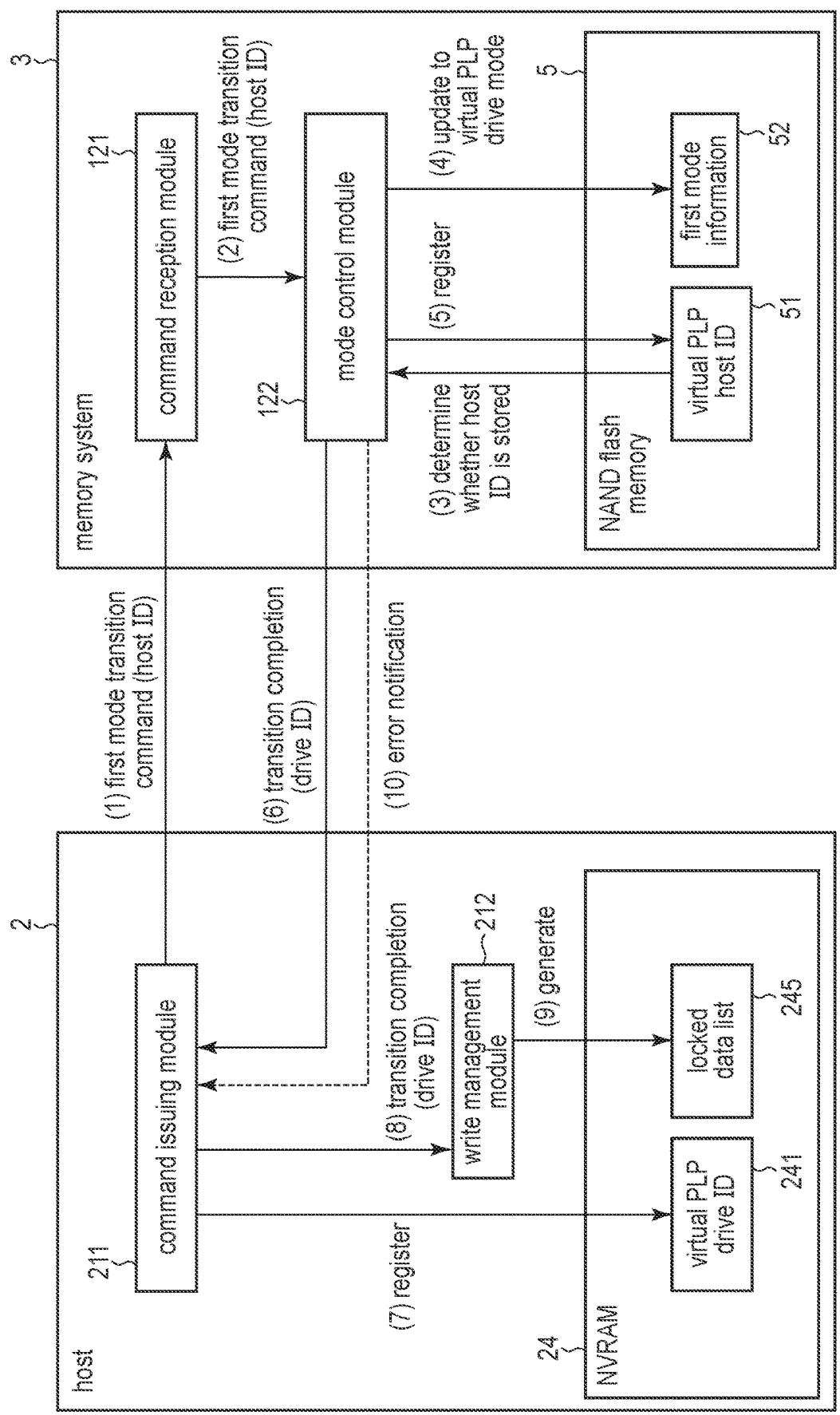
F I G. 5

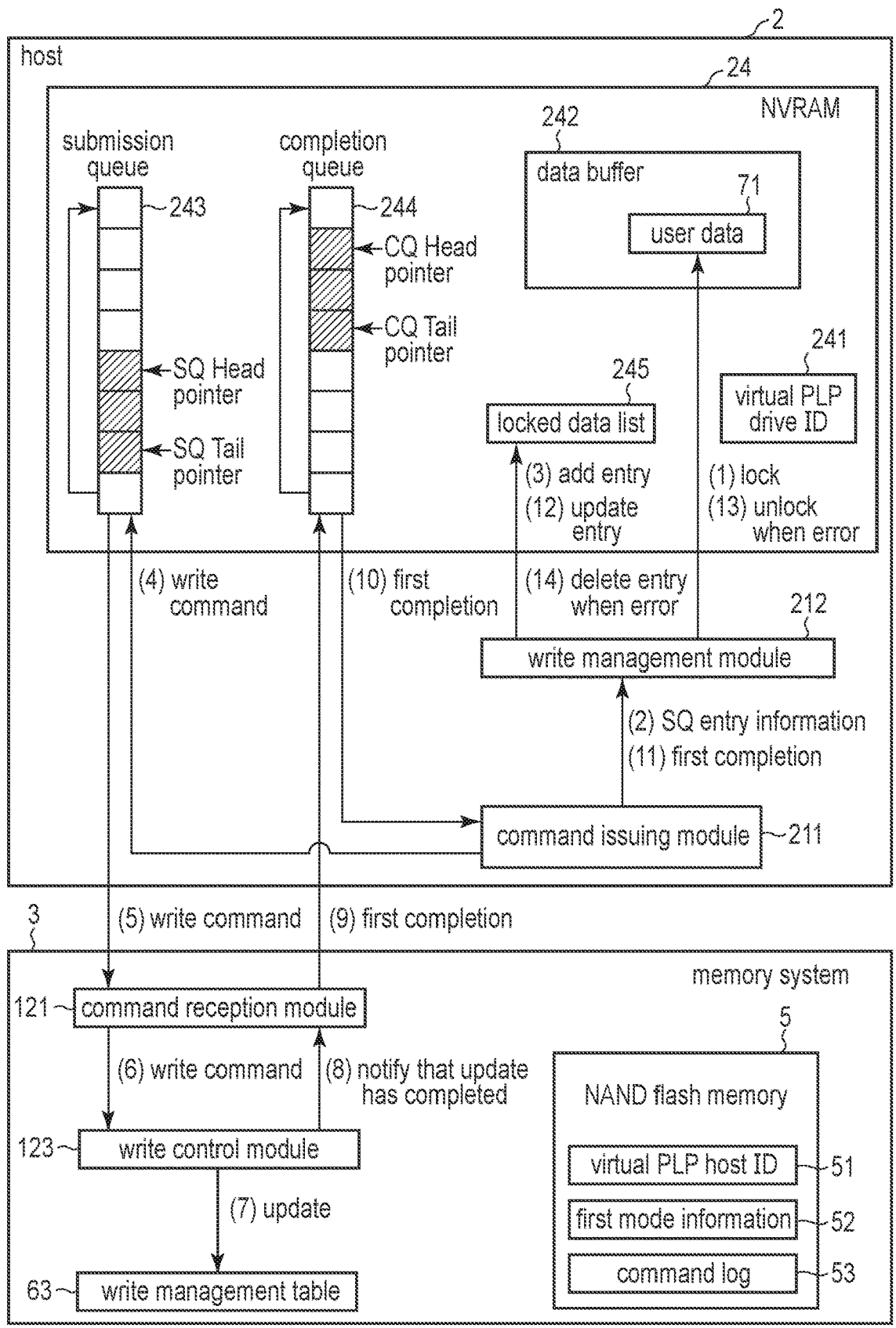
F I G. 6

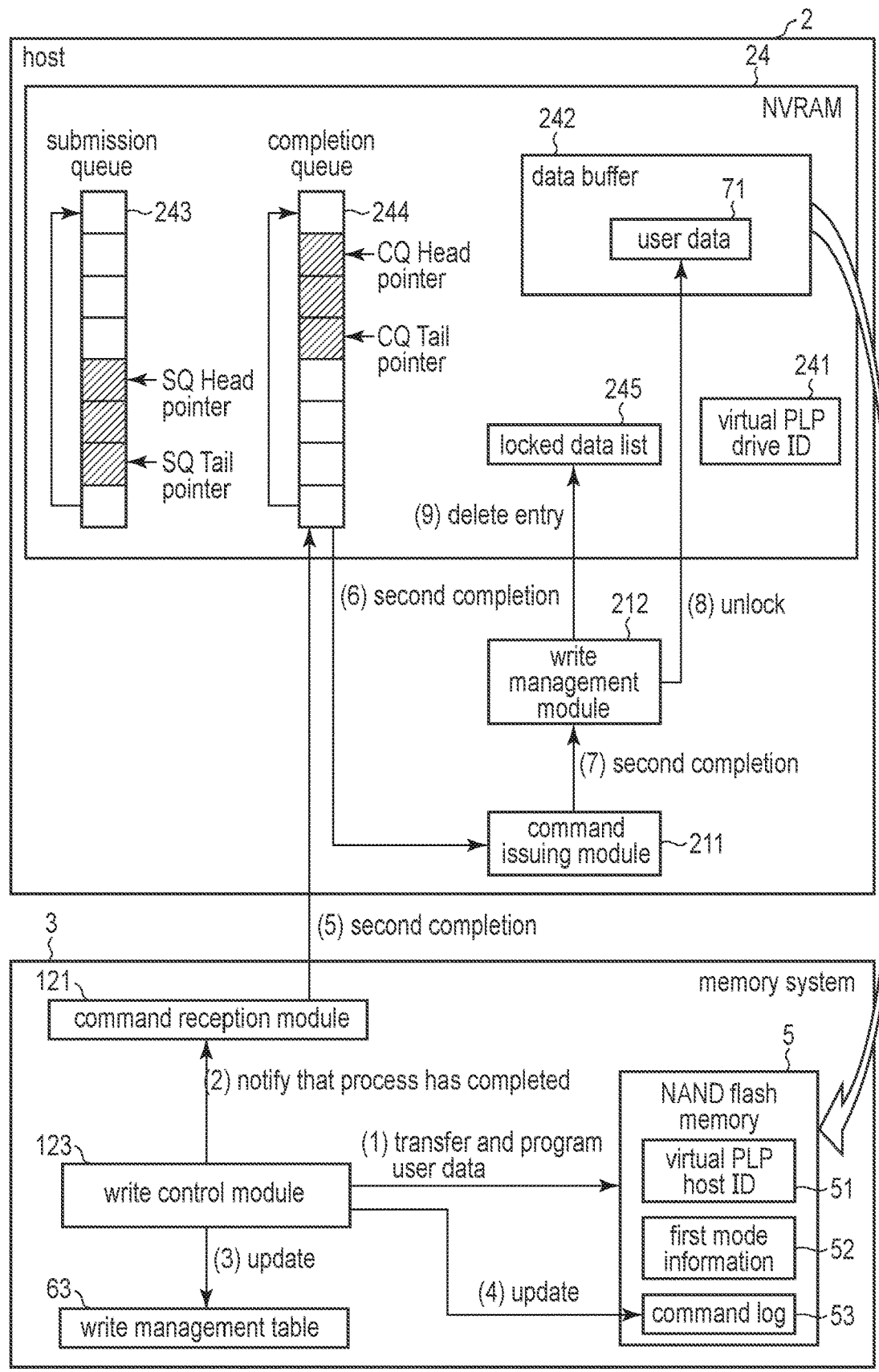
F I G. 9

| SQ entry information | completion order | data region management information | completion state |
|---|---|---|---|
| sqentry_info1 | cseq1 | region_info1 | completed |
| sqentry_info2 | cseq2 | region_info2 | completed |
| sqentry_info3 | cseq3 | region_info3 | completed |
| ... | ... | ... | ... |

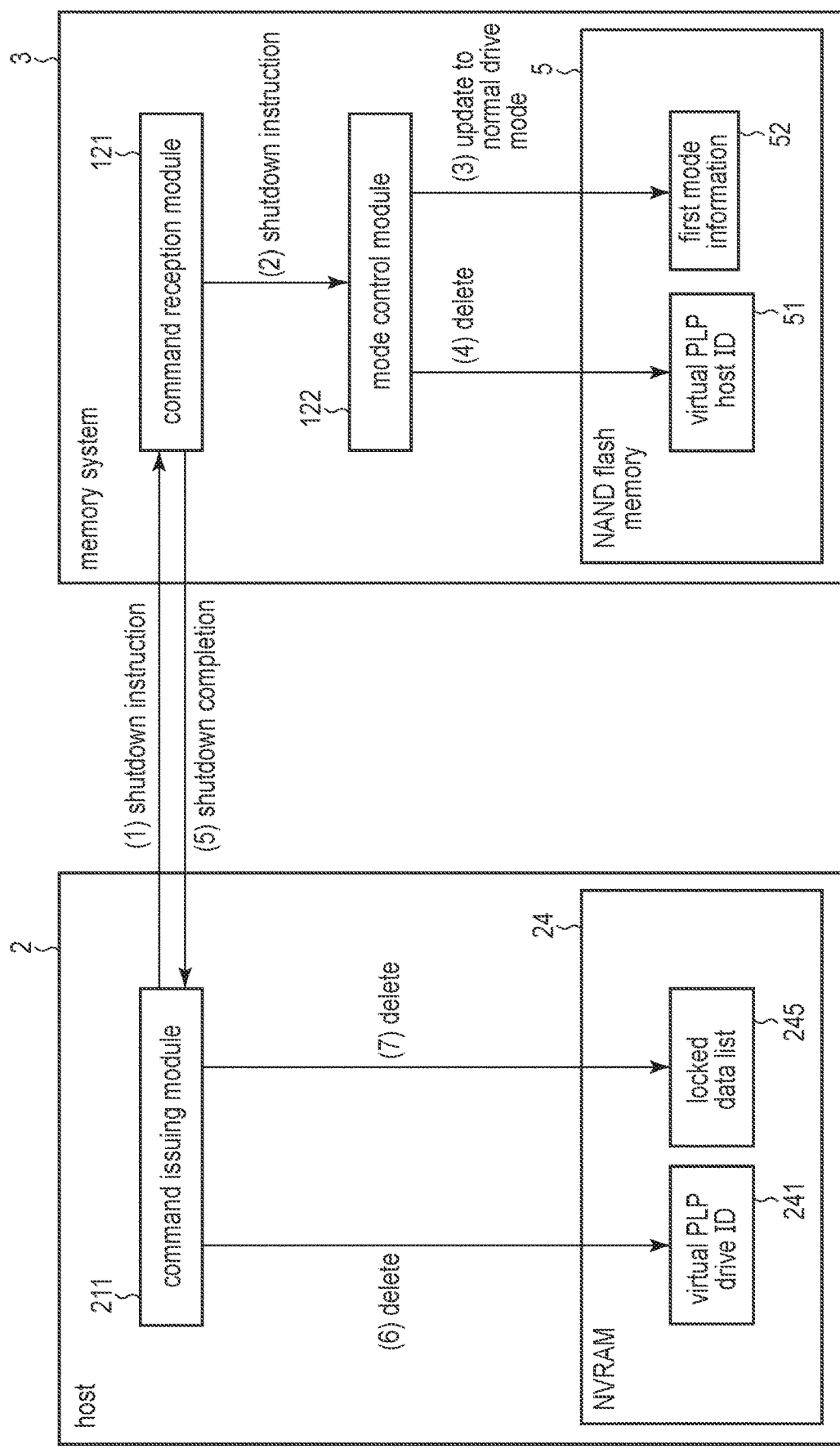
F I G. 12

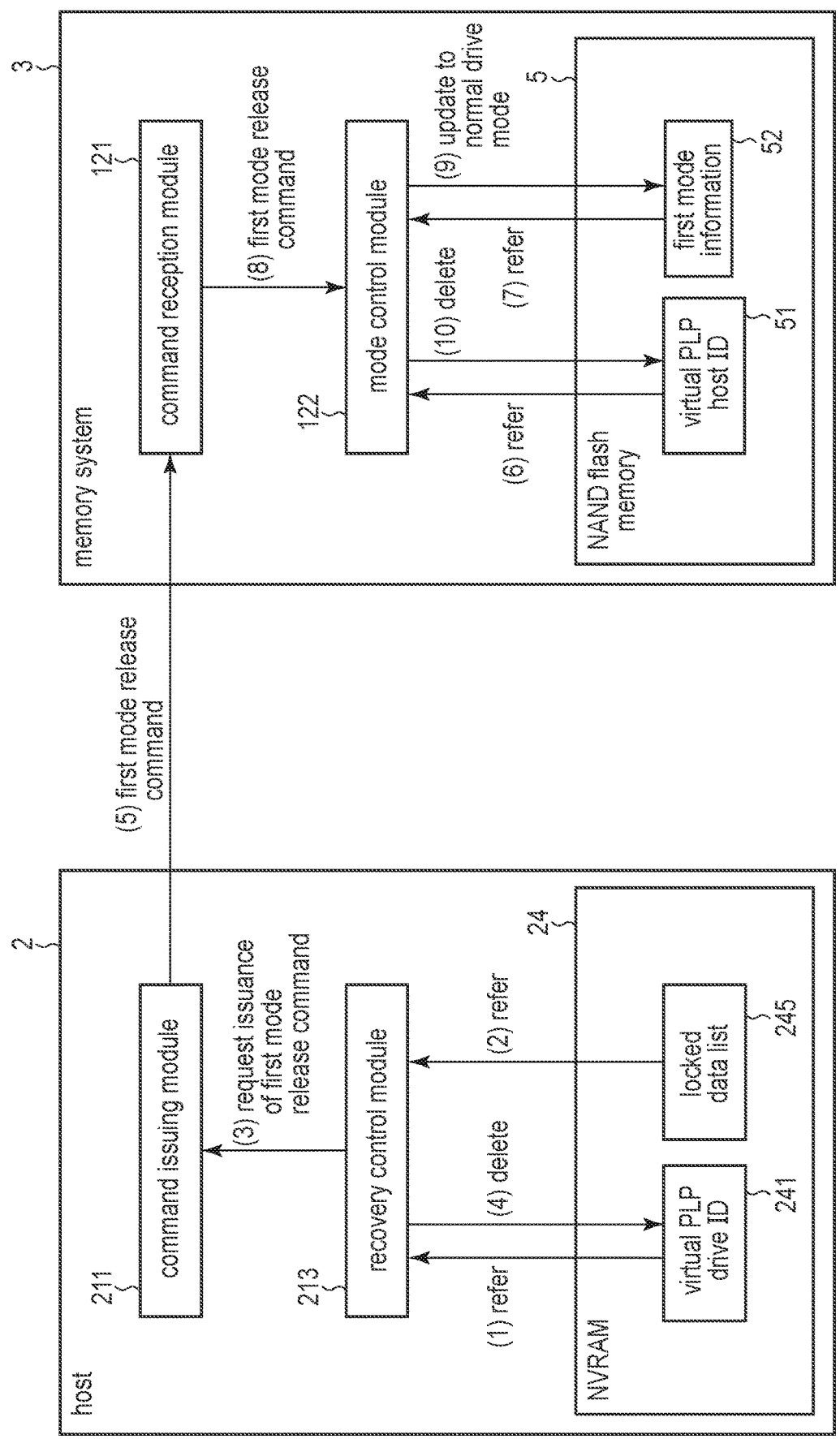
F I G. 13

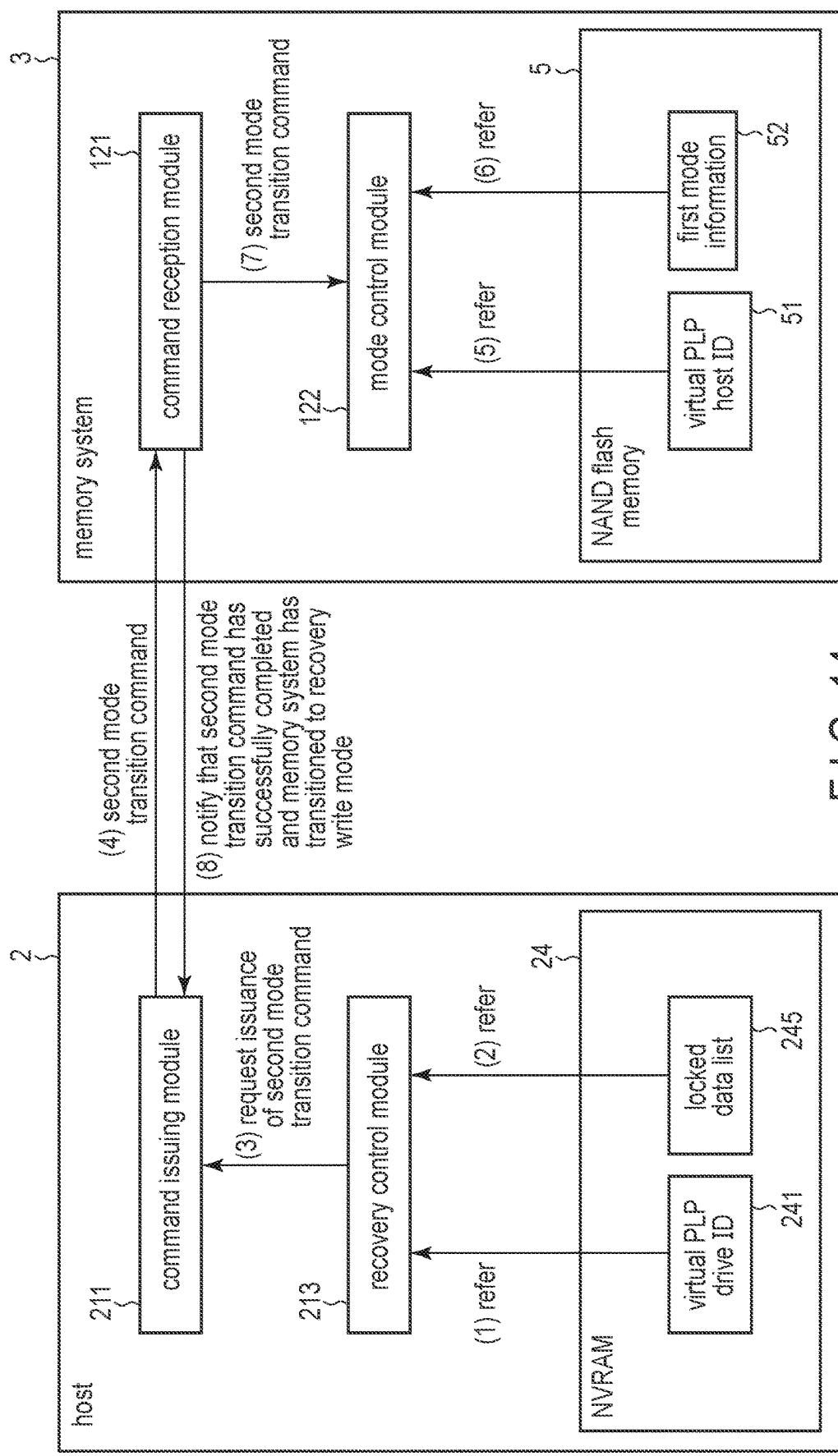
F I G. 14

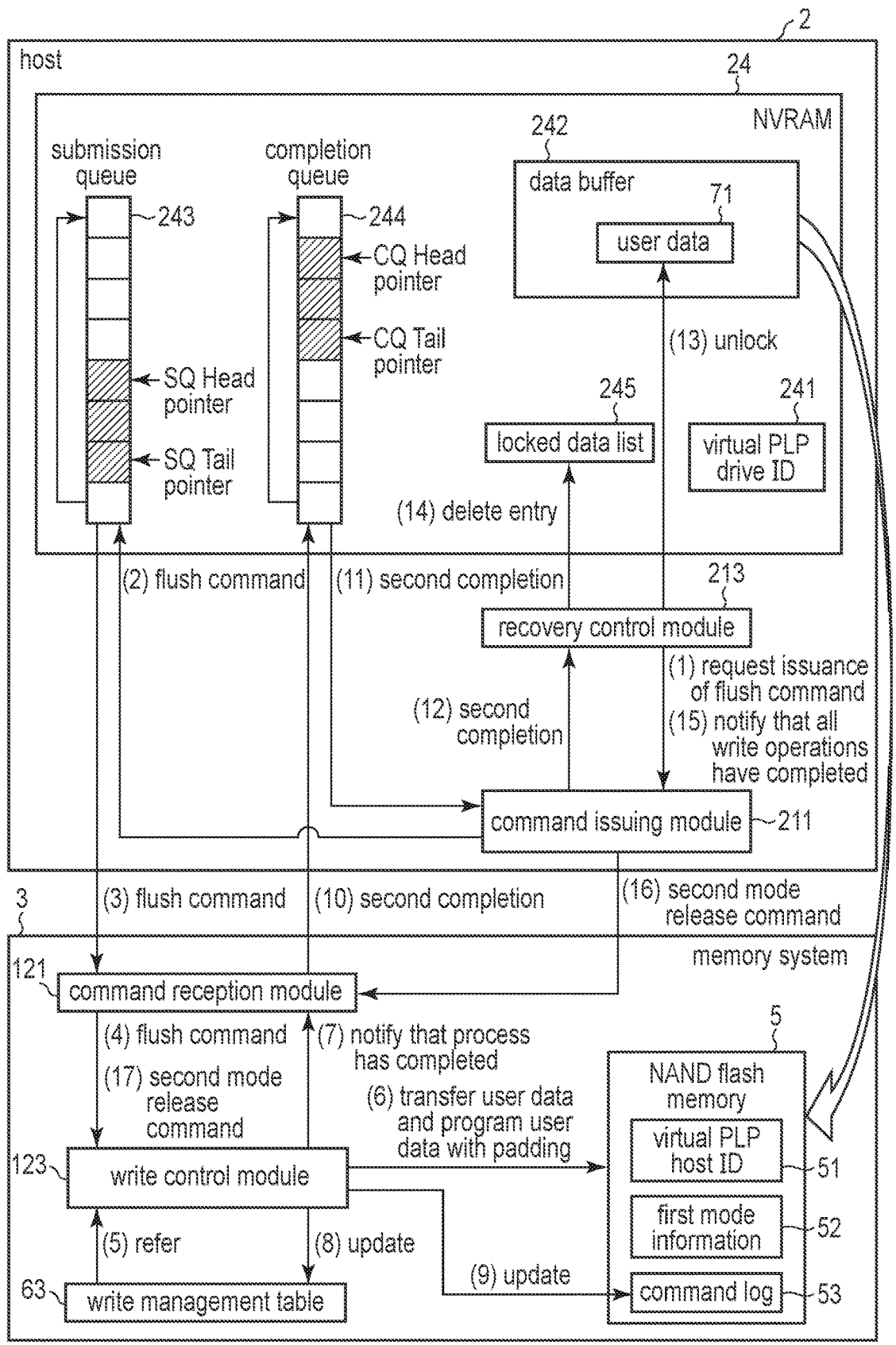
F I G. 16

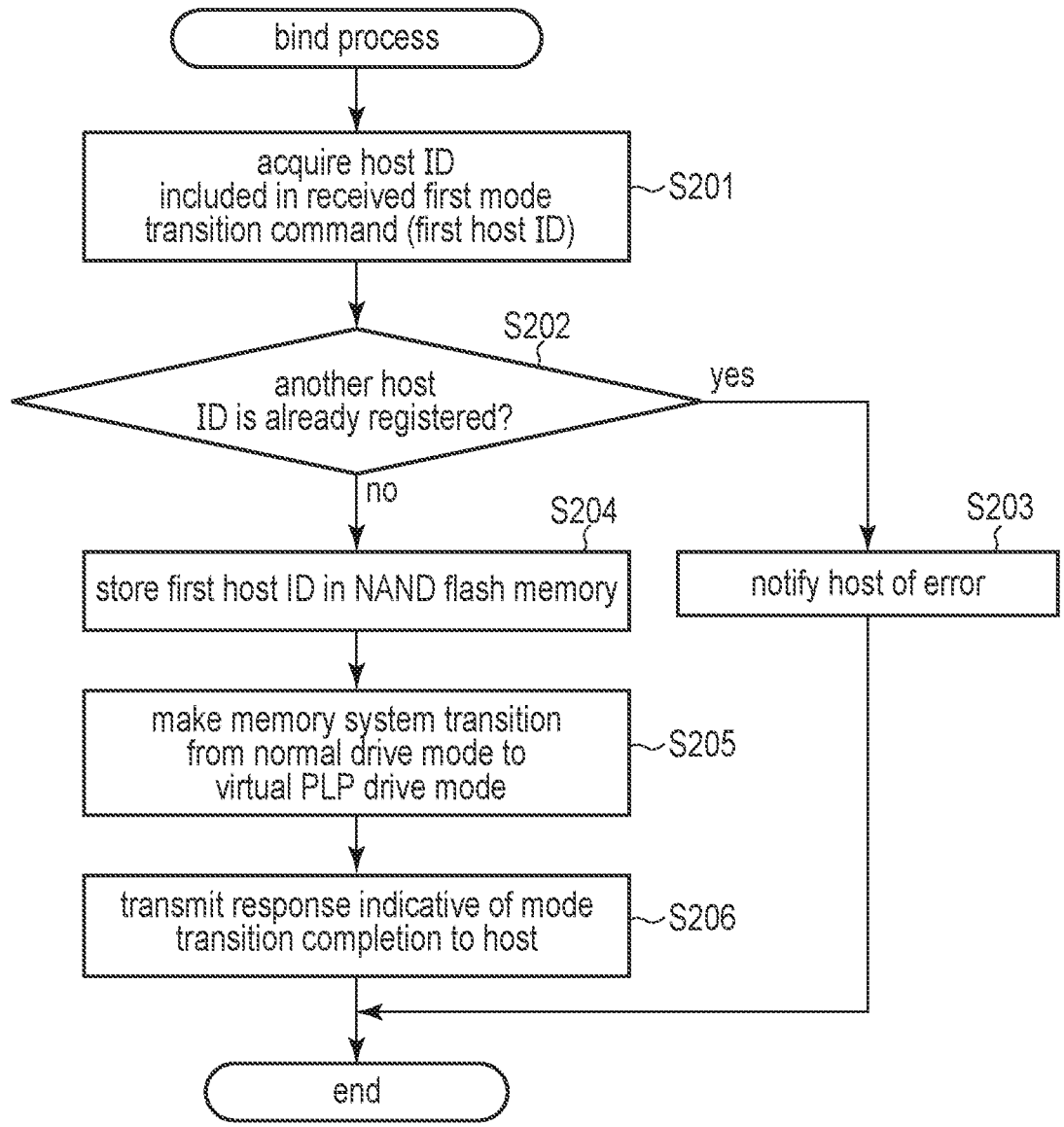
F I G. 18

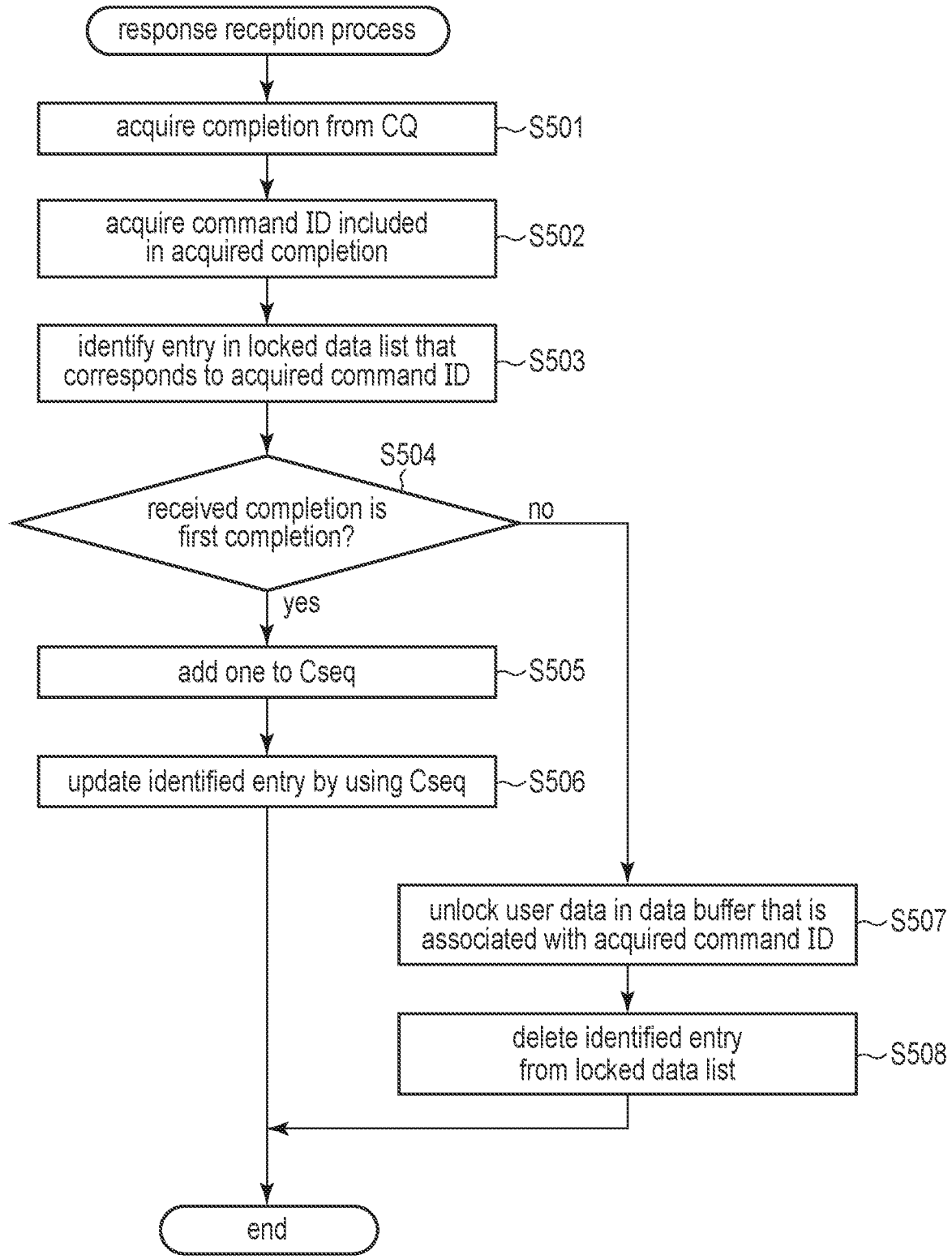
F I G. 21

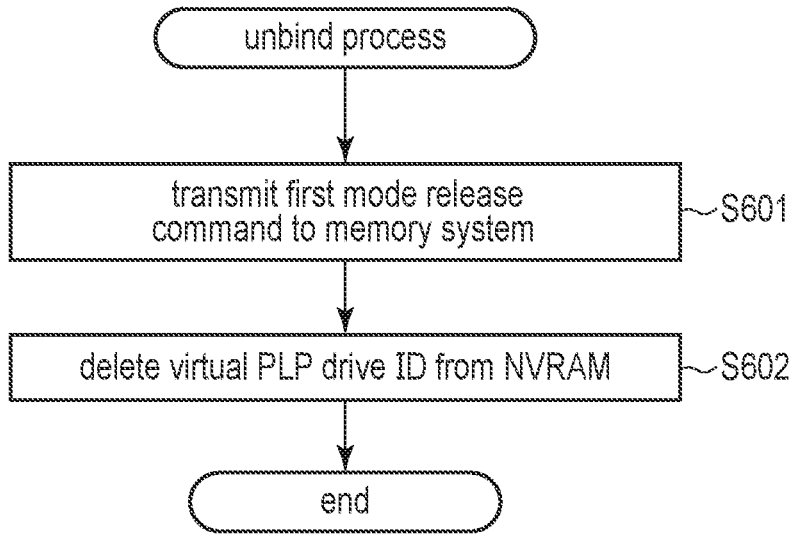
F I G. 22
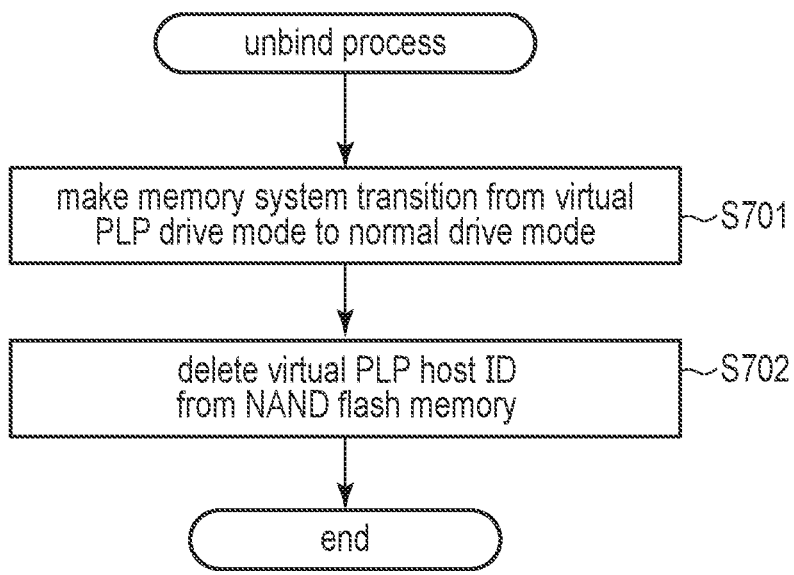
F I G. 23

INFORMATION PROCESSING APPARATUS

CROSS-REFERENCE TO RELATED APPLICATIONS

This application is based upon and claims the benefit of priority from Japanese Patent Application No. 2021-144701, filed Sep. 6, 2021, the entire contents of which are incorporated herein by reference.

FIELD

Embodiments described herein relate generally to a technique for controlling a nonvolatile memory.

BACKGROUND

In recent years, memory systems including a nonvolatile memory are widely used. As one of such memory systems, a solid state drive (SSD) including a NAND flash memory is known. The SSD is used as a main storage for various computing devices.

When receiving a write request from a host, a memory system writes user data, which is received from the host along with the reception of the write request, into a nonvolatile memory, and transmits a response to the host.

Alternatively, after the total amount of user data requested to be written by multiple write requests received from the host reaches a specific data unit, the memory system writes the user data of the specific data unit into the nonvolatile memory, and transmits responses corresponding to the respective write requests to the host. The specific data unit is, for example, the amount of data that can be written into the nonvolatile memory in a single data write operation. That is, the memory system may use a mechanism in which writing in accordance a single write request is not immediately executed but writing in accordance with multiple write requests is executed after the total amount of user data requested to be written by the multiple write requests reaches the specific data unit. Hereinafter, this mechanism is also referred to as a delayed write completion.

In the delayed write completion, for example, user data of the specific data unit (e.g., a write unit) including multiple pieces of user data that correspond to multiple write requests, respectively, is written into the nonvolatile memory, and thus, a storage area of the nonvolatile memory can be efficiently used. In the delayed write completion, however, writing and responding corresponding to each of write requests may be delayed until write requests corresponding to the user data of the write unit are received.

Incidentally, the memory system may include a storage area for temporarily storing user data requested to be written by the host (that is, a buffer). In this case, the user data is transferred from the buffer to the nonvolatile memory and is written into the nonvolatile memory.

The memory system may have a power loss protection (PLP) function. The PLP function is a function for writing, when power supplied from an external power source to the memory system is shut off, user data and the like into the nonvolatile memory by using energy of electric charge stored in a power storage device in the memory system. This user data and the like is data that has been stored in the buffer and has not yet been written into the nonvolatile memory. By the PLP function, the memory system can write the user data that is requested to be written by the host and is stored in the buffer into the nonvolatile memory even in a case where unexpected power shutoff or the like occurs.

On the other hand, the memory system may not include the buffer in which the stored data can be protected by the PLP function. In this case, if the memory system improperly terminates or unintentionally restarts during a period from reception of a write request from the host to writing of user data associated with the write request into the nonvolatile memory, the memory system cannot complete a write process corresponding to the received write request. Furthermore, when the writing is performed according to the delayed write completion, there is a possibility that the memory system cannot complete write processes corresponding to multiple received write requests.

BRIEF DESCRIPTION OF THE DRAWINGS

FIG. 1 is a block diagram illustrating an example of a configuration of an information processing system that includes an information processing apparatus (host) according to an embodiment and a memory system.

FIG. 2 is a diagram illustrating an example of a configuration of a locked data list used in the information processing apparatus of the embodiment.

FIG. 3 is a diagram illustrating an example of a configuration of a logical-to-physical address conversion table used in the memory system of FIG. 1.

FIG. 4 is a diagram illustrating an example of a configuration of a write management table used in the memory system of FIG. 1.

FIG. 5 is a block diagram illustrating an example of a bind operation in the information processing system of FIG. 1.

FIG. 6 is a block diagram illustrating an example of a write operation in the information processing system of FIG. 1.

FIG. 9 is a block diagram illustrating an example of the write operation subsequent to FIG. 6.

FIG. 12 is a block diagram illustrating an example of the shutdown operation subsequent to FIG. 11.

FIG. 13 is a block diagram illustrating an example of an unbind operation in the information processing system of FIG. 1.

FIG. 14 is a block diagram illustrating an example of a recovery operation in the information processing system of FIG. 1.

FIG. 16 is a block diagram illustrating an example of the recovery operation subsequent to FIG. 15.

FIG. 18 is a flowchart illustrating an example of the procedure of a bind process executed in the memory system of FIG. 1.

FIG. 21 is a flowchart illustrating an example of the procedure of a response reception process executed in the information processing apparatus of the embodiment.

FIG. 22 is a flowchart illustrating an example of the procedure of an unbind process executed in the information processing apparatus of the embodiment.

FIG. 23 is a flowchart illustrating an example of the procedure of an unbind process executed in the memory system of FIG. 1.

DETAILED DESCRIPTION

Figure 7:
FIG. 7 is a diagram illustrating a first example of the locked data list updated in the write operation of FIG. 6.

Various embodiments will be described hereinafter with reference to the accompanying drawings.

In general, according to one embodiment, an information processing apparatus is connectable to a memory system. The information processing apparatus includes a nonvolatile memory and a processor. The processor stores first data in the nonvolatile memory. The processor performs a first transmission of a first write request to the memory system, the first write request being associated with the first data. The processor stores first management data in the nonvolatile memory, the first management data including information equivalent to the first write request. In response to receiving, from the memory system, a first response to the first write request transmitted in the first transmission, the processor adds, to the first management data, information indicating that the first response to the first write request transmitted in the first transmission has been received. The processor deletes the first data and the first management data from the nonvolatile memory in response to receiving, from the memory system, a second response to the first write request transmitted in the first transmission after receiving the first response.

First, a configuration of an information processing system 1 including an information processing apparatus according to an embodiment will be described with reference to FIG. 1. The information processing system 1 includes an information processing apparatus 2 and a memory system 3.

The information processing apparatus 2 may be a storage server that stores a large amount of various data in the memory system 3, or may be a personal computer. Hereinafter, the information processing apparatus 2 is also referred to as a host 2.

The memory system 3 is a semiconductor storage device configured to write data to a nonvolatile memory such as a NAND flash memory, and read data from the nonvolatile memory. The memory system is also referred to as a storage device. The memory system is realized, for example, as a solid state drive (SSD).

The memory system 3 may be used as a storage of the host 2. The memory system 3 may be provided inside the host 2 or may be connected to the host 2 via a cable or a network.

An interface for connecting the host 2 and the memory system 3 conforms to standards such as PCI Express (PCIe) (registered trademark), Ethernet (registered trademark), Fibre channel, and NVM Express (NVMe) (registered trademark).

An example of the respective configurations of the host 2 and the memory system 3 will be described below.

(Configuration Example of Host 2)

The host 2 includes, for example, a CPU 21, a random access memory (RAM) 22, a storage interface (storage I/F) 23, and a nonvolatile random access memory (NVRAM) 24. The CPU 21, the RAM 22, the storage I/F 23, and the NVRAM 24 may be connected via a bus 20.

The CPU 21 is, for example, at least one processor. The CPU 21 controls operations of various components in the host 2.

The RAM 22 is a volatile memory. The RAM 22 is realized, for example, as a dynamic random access memory (DRAM) or a static random access memory (SRAM). The storage area of the RAM 22 is allocated as, for example, a storage area of an operating system (OS) 221, a driver 222, and various application programs. Hereinafter, the application program is also simply referred to as an application.

The storage I/F 23 functions as a control circuit that controls communication between the host 2 and the memory system 3. The storage I/F 23 transmits various commands, for example, input/output (I/O) commands and various control commands to the host 2. The I/O commands include, for example, a write command and a read command. The control commands include, for example, a flush command, a virtual PLP drive mode transition command, a virtual PLP drive mode release command, a recovery mode transition command, and a recovery mode release command. The virtual PLP drive mode transition command is also referred to as a first mode transition command. The virtual PLP drive mode release command is also referred to as a first mode release command. The recovery mode transition command is also referred to as a second mode transition command. The recovery mode release command is also referred to as a second mode release command.

The flush command is a command for writing user data that has not been written into a NAND flash memory 5 of the memory system 3, from a storage area in the host 2 or the memory system 3 into the NAND flash memory 5 of the memory system 3.

The first mode transition command is a command for making the memory system 3 transition from a normal drive mode to a virtual power loss protection (PLP) drive mode. The first mode transition command includes, for example, identification information of the host 2 (host ID) that has issued the first mode transition command. The host ID is information that enables the memory system 3 to uniquely identify a host. As the host ID, for example, a host identifier defined in the NVMe standard is used.

In the memory system 3, either the normal drive mode or the virtual PLP drive mode is set as a first operation mode. The host 2 provides a virtual PLP function to the memory system 3 having transitioned to the virtual PLP drive mode (that is, the memory system 3 whose first operation mode is the virtual PLP drive mode). The virtual PLP function is a function of recovering writing of user data to the memory system 3 (more specifically, to the NAND flash memory 5) that has failed to be completed because of an improper termination of the host 2, an improper termination of the memory system 3 resulting from unexpected power shutoff or the like, or an unintended restart of the memory system 3, by using data stored in the NVRAM 24.

Hereinafter, the memory system 3 that has been made to transition to the virtual PLP drive mode by the host 2 using the first mode transition command is also referred to as the memory system 3 operating in the virtual PLP drive mode for the host 2. Note that the host 2 does not provide the virtual PLP function to the memory system 3 that has not been made to transition to the virtual PLP drive mode (that is, the memory system 3 whose first operation mode is the normal drive mode).

The first mode release command is a command for making the memory system 3 transition from the virtual PLP drive mode to the normal drive mode.

The second mode transition command is a command for making the memory system 3 transition from a normal write mode to a recovery write mode. In the memory system 3, either the normal write mode or the recovery write mode is set as a second operation mode. In the memory system 3 that has transitioned to the recovery write mode (that is, the memory system 3 whose second operation mode is the recovery write mode), it is ensured that write processes corresponding to write commands received from the host 2 are executed in the order of reception of the write commands. In the memory system 3 that has not transitioned to the recovery write mode (that is, the memory system 3 whose second operation mode is the normal write mode), there is a possibility that it is not ensured that write processes corresponding to write commands received from the host 2 are executed in the order of reception of the write commands.

The second mode release command is a command for making the memory system 3 transition from the recovery write mode to the normal write mode.

The NVRAM 24 is a nonvolatile memory. As the NVRAM 24, for example, a magnetoresistive random access memory (MRAM), a phase change random access memory (PRAM), a resistive random access memory (ReRAM), or a ferroelectric random access memory (FeRAM) is used. The storage area of the NVRAM 24 is allocated as a storage area of various data used for processing by the host 2, a buffer area used as a data buffer 242, an area of a submission queue (SQ) 243, an area of a completion queue (CQ) 244, and a storage area of a pointer list 246.

The data buffer 242 is a storage area for temporarily storing user data to be written into the NAND flash memory 5 of the memory system 3.

The submission queue 243 is a queue that stores a command to be transmitted from the host 2 to the memory system 3.

The completion queue 244 is a queue that stores a response (completion) returned from the memory system 3 to the host 2. The memory system 3 may respond to one write command with multiple completions.

Note that the host 2 may implement the submission queue 243 and the completion queue 244 for each command type, for example, the submission queue 243 and the completion queue 244 for management commands and another submission queue 243 and completion queue 244 for input/output commands such as a read command and a write command, with respect to one memory system 3. In addition, the host 2 may implement multiple submission queues 243/completion queues 244 for input/output commands with respect to one memory system 3. In the embodiment, the submission queue 243/completion queue 244 is provided in the NVRAM 24, but the submission queue 243/completion queue 244 for commands other than write commands may be provided in the RAM 22.

The pointer list 246 is a list of pointers each indicating a location in the data buffer 242 of user data that is associated with a write command or a read command. In the embodiment, the pointer list 246 is stored in the NVRAM 24, but the pointer list 246 may be stored in the RAM 22.

Examples of various data used for processing by the host 2 include a virtual PLP drive ID 241 and a locked data list 245.

The virtual PLP drive ID 241 indicates identification information of the memory system 3 (drive ID) that has been made to transition to the virtual PLP drive mode by the host 2. The drive ID is information that enables the host 2 to uniquely identify one memory system 3. Incidentally, in a case where the host 2 makes each of multiple memory systems 3 to transition to the virtual PLP drive mode, the NVRAM 24 stores multiple virtual PLP drive IDs 241 that correspond to the memory systems 3, respectively.

The locked data list 245 is data for managing a processing status of a write command issued from the host 2 to the memory system 3. One locked data list 245 corresponds to, for example, one memory system 3. More specifically, the locked data list 245 is associated with, for example, the virtual PLP drive ID 241 of a corresponding memory system 3.

Locked data lists 245 that correspond to memory systems 3, respectively, may be stored in the NVRAM 24. In that case, each of the locked data lists 245 is associated with the virtual PLP drive ID 241 of a corresponding memory system 3. That is, the host 2 is capable of identifying a locked data list 245 to be used for a memory system 3 by using the virtual PLP drive ID 241 of the memory system 3.

FIG. 2 illustrates an example of a configuration of the locked data list 245 used in the host 2. The locked data list 245 may include one or more entries that correspond to one or more write commands, respectively, that are transmitted from the host 2 to the memory system 3. Each of the entries includes, for example, an SQ entry information field, a completion order field, a data region management information field, and a completion state field.

The SQ entry information field indicates information (SQ entry information) representing a corresponding write command. The SQ entry information includes information such as the type and content of the command and a parameter necessary at the time of execution. Specifically, the SQ entry information field indicates, for example, a command operation code, a data pointer, a command ID, a namespace ID, a logical block address (LBA), and a data length.

The command operation code is a code indicative of a type of a corresponding command (here, a write command). As the command operation code, for example, Opcode defined in the NVMe standard is used.

The data pointer is information indicative of a location in the host 2 where user data to be written in accordance with the corresponding write command is stored. As the data pointer, for example, a Physical Region Page (PRP) entry or a list thereof, or Scatter Gather List (SGL) defined in the NVMe standard is used. In a case where the PRP is used when the amount of data is large, a pointer to a list of PRP entries is stored in the SQ entry information field. In a case where the SGL is used, only the first segment of the SGL is stored in the SQ entry information field. Note that the list of PRP entries, or the second and subsequent segments of the SGL are stored in the pointer list 246.

The command ID is identification information of the corresponding write command.

The namespace ID is identification information of a namespace in which the corresponding write command is to be executed. There may be multiple logical address spaces (LBA spaces) used by the host 2 to access the memory system 3. Each logical address space may be referred to as a namespace. One of namespaces may be identified by a namespace ID.

The LBA is an LBA designated in the corresponding write command. The LBA indicates the start LBA of an LBA range in which the user data is to be written in accordance with the write command.

The data length is a data length designated in the corresponding write command. The data length indicates the length of the user data to be written in accordance with the write command. Therefore, when the LBA and the data length are designated in the write command, it is possible to identify the LBA range in which the user data is to be written in accordance with the write command.

The completion order field indicates the order in which a first completion for the corresponding write command is received. To each of one or more completions received by the host 2, a sequence number according to the received order is assigned. The completion order field indicates a sequence number assigned to the first completion for the corresponding write command.

The data region management information field indicates information capable of identifying a storage area (for example, a page) in the NVRAM 24 in which the user data to be written in accordance with the corresponding write command is stored. This information may be used, for example, to lock or unlock the identified storage area in the NVRAM 24 by using the function of the OS 221.

The completion state field indicates whether the first completion for the corresponding write command has been received. Note that the completion state field may be omitted, and the fact that the sequence number is stored in the completion order field may be considered to indicate that the first completion for the corresponding write command has been received.

In the following description of the locked data list 245, a value indicated in the SQ entry information field is also simply referred to as SQ entry information. The same applies to values indicated in the other fields of the locked data list 245 and values indicated in fields of other tables.

The description returns to FIG. 1. Here, programs executed by the CPU 21 will be described.

The CPU 21 executes various programs loaded from the NVRAM 24 to the RAM 22, for example. The programs executed by the CPU 21 include the OS 221, the driver 222, and various applications.

The OS 221 is a program for controlling basic operations of various components in the host 2. The CPU 21 executing the OS 221 controls, for example, input/output, file management, memory management, and communication.

The driver 222 is a program for controlling a device connected to the host 2. For example, the CPU 21 executing the driver 222 transmits a command and data to the memory system 3 via the storage I/F 23. The CPU 21 executing the driver 222 receives a response to the command and data from the memory system 3 via the storage I/F 23.

The CPU 21 functions as, for example, a command issuing module 211, a write management module 212, and a recovery control module 213 by executing the driver 222. Specific operations of the command issuing module 211, the write management module 212, and the recovery control module 213 will be described later with reference to FIGS. 5 to 16. The command issuing module 211, the write management module 212, and the recovery control module 213 may be realized by a dedicated hardware in the host 2.

(Configuration Example of Memory System 3)

The memory system 3 includes, for example, a controller 4, the NAND flash memory 5, and a DRAM 6. The controller 4 may be realized by a circuit such as a system-on-a-chip (SoC). The controller 4 may include an SRAM. Further, the DRAM 6 may be provided inside the controller 4.

The DRAM 6 is a volatile memory. A RAM such as the DRAM 6, includes, for example, a storage area of a firmware (FW) 61, a cache area of a logical-to-physical address conversion table 62, and a storage area of a write management table 63.

The FW 61 is a program for controlling an operation of the controller 4. The FW 61 is loaded from the NAND flash memory 5 to the DRAM 6, for example.

The logical-to-physical address conversion table 62 manages mapping between each logical address and each physical address of the NAND flash memory 5.

The write management table 63 manages information related to a received write command.

The NAND flash memory 5 includes multiple blocks. Each of the blocks includes multiple pages. The blocks each function as the minimum unit of a data erase operation. The block may also be referred to as an erase block or a physical block. Each of the pages includes memory cells connected to a single word line. The pages each function as a unit of a data write operation and a data read operation. Note that a word line may function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data write operation (data program operation) to write data in each page of the block.

For example, user data and management data may be written into the NAND flash memory 5. The user data is data that is associated with a write command received from the host 2 and is to be written into the NAND flash memory 5. The management data is data for managing the operation of the memory system 3. The management data includes, for example, a virtual PLP host ID 51, first mode information 52, and a command log 53.

The virtual PLP host ID 51 indicates the host ID of the host 2 that has made the memory system 3 transition to the virtual PLP drive mode. The virtual PLP host ID 51 is stored in the NAND flash memory 5 while the memory system 3 operates in the virtual PLP drive mode.

The first mode information 52 indicates whether the first operation mode of the memory system 3 is the normal drive mode or the virtual PLP drive mode. In a case where the memory system 3 has transitioned from the normal drive mode to the virtual PLP drive mode, the first mode information 52 is updated so as to indicate the virtual PLP drive mode. In addition, in a case where the memory system 3 has transitioned from the virtual PLP drive mode to the normal drive mode, the first mode information 52 is updated so as to indicate the normal drive mode.

The command log 53 indicates a command ID of a command for which a corresponding process is completed. The command log 53 is used for debug of the memory system 3. The controller 4 stores a command ID in the command log 53 so that the order in which the process corresponding to the command is completed can be managed.

The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of a relationship between each logical address and each physical address of the NAND flash memory 5, and (2) process to hide a difference between read/write operations executed in units of page and erase operations in units of block. The block management includes management of defective blocks, wear leveling, and garbage collection.

The logical address is an address used by the host 2 for addressing the memory system 3. The logical address is, for example, a logical block address (LBA). Hereinafter, a case where the LBA is used as the logical address will be mainly explained.

Management of mapping between each LBA and each physical address is executed using the logical-to-physical address conversion table 62. The controller 4 uses the logical-to-physical address conversion table 62 to manage the mapping between each LBA and each physical address in a certain management size. A physical address corresponding to an LBA indicates a physical memory location in the NAND flash memory 5 to which data of the LBA is written. The controller 4 manages multiple storage areas that are obtained by logically dividing the storage area of the NAND flash memory 5, using the logical-to-physical address conversion table 62. The multiple storage areas correspond to multiple LBAs, respectively. That is, each of the storage areas is identified by one LBA. The logical-to-physical address conversion table 62 may be loaded from the NAND flash memory 5 to the DRAM 6 when the memory system 3 is powered on.

The data write operation into one page is executable only once in a single P/E cycle. Thus, the controller 4 writes updated data corresponding to an LBA not to an original physical memory location in which previous data corresponding to the LBA is stored but to a different physical memory location. Then, the controller 4 updates the logical-to-physical address conversion table 62 to associate the LBA with this different physical memory location than the original physical memory location and to invalidate the previous data. Data to which the logical-to-physical address conversion table 62 refers (that is, data associated with an LBA) will be referred to as valid data. Furthermore, data not associated with any LBA will be referred to as invalid data. The valid data is data to possibly be read by the host 2 later. The invalid data is data not to be read by the host 2 anymore.

The controller 4 may include a host interface (host I/F) 11, a CPU 12, a NAND interface (NAND I/F) 13, a DRAM interface (DRAM I/F) 14, and a timer 15. The host I/F 11, the CPU 12, the NAND I/F 13, the DRAM I/F 14, and the timer 15 may be connected via a bus 10.

The host I/F 11 functions as a circuit that receives various commands, for example, I/O commands and various control commands from the host 2. In addition, the host I/F 11 functions as a circuit that transmits a response to a command and data to the host 2.

The NAND I/F 13 electrically connects the controller 4 and the NAND flash memory 5. The NAND I/F 13 conforms to an interface standard such as a toggle double data rate (DDR) and an open NAND flash interface (ONFI).

The NAND I/F 13 functions as a NAND control circuit configured to control the NAND flash memory 5. The NAND I/F 13 may be connected to memory chips in the NAND flash memory 5 via multiple channels (Ch). By operating the memory chips in parallel, it is possible to broaden an access bandwidth between the controller 4 and the NAND flash memory 5

The DRAM I/F 14 functions as a DRAM control circuit configured to control access to the DRAM 6.

The timer 15 measures time. The timer 15 may provide the measured time to each unit in the controller 4.

The CPU 12 is a processor configured to control the host I/F 11, the NAND I/F 13, the DRAM I/F 14, and the timer 15. The CPU 12 performs various processes by executing the FW 61 loaded from the NAND flash memory 5 onto the DRAM 6. The FW 61 is a control program including instructions for causing the CPU 12 to execute various processes. The CPU 12 may perform command processes to execute various commands from the host 2. The operation of the CPU 12 is controlled by the FW 61 executed by the CPU 12.

The function of each unit in the controller 4 may be realized by dedicated hardware in the controller 4 or may be realized by the CPU 12 executing the FW 61.

The CPU 12 functions as, for example, a command reception module 121, a mode control module 122, and a write control module 123. The CPU 12 functions as these modules, for example, by executing the FW 61. Specific operations of the command reception module 121, the mode control module 122, and the write control module 123 will be described later with reference to FIGS. 5 to 16.

Next, two tables used in the memory system 3 will be described with reference to FIGS. 3 and 4.

FIG. 3 illustrates an example of a configuration of the logical-to-physical address conversion table 62. The logical-to-physical address conversion table 62 manages mapping between each LBA and each physical address of the NAND flash memory 5. The controller 4 may convert an LBA into a physical address by using the logical-to-physical address conversion table 62. Further, the controller 4 may convert a physical address into an LBA by using the logical-to-physical address conversion table 62.

In the example illustrated in FIG. 3, a physical address "X", a physical address "Y", and a physical address "Z" are mapped to an LBA "0", an LBA "1", and an LBA "2", respectively.

FIG. 4 illustrates an example of a configuration of the write management table 63. The write management table 63 may include one or more entries that correspond to one or more write commands, respectively. Each entry includes, for example, a command ID field, an LBA field, a data length field, and a data pointer field.

The command ID field indicates a command ID of a corresponding write command.

The LBA field indicates an LBA designated in the corresponding write command. The LBA indicates a start LBA of an LBA range in which user data is to be written in accordance with the write command.

The data length field indicates a data length designated in the corresponding write command. The data length indicates the length of the user data that is to be written in accordance with the write command. Accordingly, the LBA range in which the user data is to be written in accordance with the write command is identified by using the LBA and the data length designated in the write command.

The data pointer field indicates a data pointer designated in the corresponding write command. The data pointer indicates a location in the host 2 where the user data that is to be written to the NAND flash memory 5 in accordance with the write command is stored. That is, the controller 4 transfers the user data from the storage location in the host 2 indicated by the data pointer to the memory system 3.

Next, examples of several operations performed in the information processing system 1 will be described with reference to FIGS. 5 to 16.

FIG. 5 is a block diagram illustrating an example of a bind operation in the information processing system 1. The bind operation is an operation for performing initial setting for operating the memory system 3 connected to the host 2 in the virtual PLP drive mode.

Specifically, first, the command issuing module 211 of the host 2 transmits a first mode transition command to the memory system 3 that is connected to the host 2, via the submission queue 243 ((1) in FIG. 5). The first mode transition command may include the host ID of the host 2. Note that the host 2 may notify the memory system 3 of the host ID separately from the transmission of the first mode transition command.

In the memory system 3, the command reception module 121 receives the first mode transition command. The command reception module 121 sends the received first mode transition command to the mode control module 122 ((2) in FIG. 5).

The mode control module 122 determines whether the host ID included in the first mode transition command is stored in the NAND flash memory 5 as the virtual PLP host ID 51 ((3) in FIG. 5).

In a case where the host ID is not stored in the NAND flash memory 5, the mode control module 122 makes the memory system 3 transition to the virtual PLP drive mode, and updates the first mode information 52 so as to indicate the virtual PLP drive mode ((4) in FIG. 5). Then, the mode control module 122 writes the host ID included in the first mode transition command into the NAND flash memory 5. Accordingly, the host ID of the host 2 that has made the memory system 3 transition to the virtual PLP drive mode is registered as the virtual PLP host ID 51 in the NAND flash memory 5 ((5) in FIG. 5). Then, the mode control module 122 transmits a response indicating that the transition to the virtual PLP drive mode has completed and the drive ID of the memory system 3 to the command issuing module 211 via the command reception module 121 and the completion queue 244 ((6) in FIG. 5).

The command issuing module 211 of the host 2 receives the response transmitted by the memory system 3. The command issuing module 211 stores the drive ID included in the received response in the NVRAM 24 ((7) in FIG. 5). Accordingly, the drive ID of the memory system 3 that has been made to transition to the virtual PLP drive mode by the host 2 is registered as the virtual PLP drive ID 241 in the NVRAM 24. In addition, the command issuing module 211 sends the received response to the write management module 212 ((8) in FIG. 5). The write management module 212 generates the locked data list 245 associated with the virtual PLP drive ID 241 on the basis of the response indicating that the transition to the virtual PLP drive mode has completed, and stores the locked data list in the NVRAM 24 ((9) in FIG. 5).

Note that in a case where another host ID different from the host ID included in the first mode transition command has already been stored as the virtual PLP host ID 51 in the NAND flash memory 5, the memory system 3 is operating in the virtual PLP drive mode for another host that has said another host ID. In such a case, the mode control module 122 does not transition to the virtual PLP drive mode in accordance with the received first mode transition command. The mode control module 122 returns an error notification indicating that the mode has not transitioned to the virtual PLP drive mode, to the command issuing module 211 via the command reception module 121 and the completion queue 244 ((10) in FIG. 5).

By the above bind operation, the host 2 can make the memory system 3 transition to the virtual PLP drive mode when the memory system 3 is not operating in the virtual PLP drive mode for another host. Then, in the memory system 3, the host ID of the host 2 and the first mode information 52 indicating that the memory system 3 is operating in the virtual PLP drive mode are stored in the NAND flash memory 5. In the host 2, the drive ID of the memory system 3 and the locked data list 245 associated with the drive ID are stored in the NVRAM 24. In this way, in the host 2 and the memory system 3, initial setting for operating the memory system 3 in the virtual PLP drive mode can be performed.

(Write Operation)

Next, an example of a write operation in the information processing system 1 will be described with reference to FIGS. 6 to 10. The write operation is an operation for transmitting a write command from the host 2 to the memory system 3 and writing user data associated with the write command into the NAND flash memory 5. The write operation is performed, for example, after the bind operation described above with reference to FIG. 5.

Here, the submission queue 243 and the completion queue 244 provided in the NVRAM 24 of the host 2 will be described. The host 2 transmits a command to the memory system 3 via the submission queue 243. In addition, the memory system 3 returns a completion for the command to the host 2 via the completion queue 244.

The submission queue 243 includes multiple slots in which the host 2 stores commands, respectively, which are issued for the memory system 3. A location in the submission queue 243 (that is, a slot) to which the host 2 should store a command is indicated by an SQ Tail pointer. A location in the submission queue 243 from which the memory system 3 should fetch a command is indicated by an SQ Head pointer.

The completion queue 244 includes multiple slots to which the memory system 3 stores responses to commands, respectively. A location in the completion queue 244 to which the memory system 3 should store a response is indicated by a CQ Tail pointer. A location in the completion queue 244 from which the host 2 should fetch a response is indicated by a CQ Head pointer.

An example of a specific write operation in the host 2 and the memory system 3 will be described below. In the example illustrated in FIGS. 6 to 10, a case where commands written to the submission queue 243 are only write commands will be explained for easy understanding.

FIG. 6 is a block diagram illustrating an example of the write operation in the information processing system 1. Here, a case where the command issuing module 211 and the write management module 212 of the host 2 receive a write request for writing user data 71 into the NAND flash memory 5 will be explained. This write request is, for example, a write request by an application executed by the CPU 21.

First, in the host 2, the write management module 212 locks the user data 71 that is requested to be written and is stored in the data buffer 242 by using the function of the application or the OS 221 ((1) in FIG. 6). More specifically, the write management module 212 locks a storage area (for example, a page) in which the user data 71 is stored, by using the function of the OS 221. Therefore, the storage area storing the user data 71 is prevented from being unintentionally released or paged out. Note that the user data 71 may be stored in the RAM 22 by using the function of the application or the OS 221. In a case where the user data 71 is stored in the RAM 22, the write management module 212 copies the user data 71 from the RAM 22 to the NVRAM 24.

The command issuing module 211 issues a write command for writing the user data 71. That is, the command issuing module 211 generates SQ entry information equivalent to the write command for writing the user data 71. The command issuing module 211 sends the generated SQ entry information to the write management module 212 ((2) in FIG. 6).

The write management module 212 generates an entry of the locked data list 245 by using the SQ entry information sent by the command issuing module 211. The generated entry includes, for example, SQ entry information equivalent to the issued write command, and data region management information. The data region management information is information capable of identifying a storage area in the data buffer 242 in which the user data 71 is stored. The write management module 212 adds the generated entry to the locked data list 245 ((3) in FIG. 6).

FIG. 7 illustrates an example of the locked data list 245 to which the entry is added in the operation of (3) in FIG. 6. The locked data list 245 includes the added entry 81.

In the example illustrated in FIG. 7, the entry 81 includes SQ entry information "sqentry_info1" equivalent to the issued write command and data region management information "region_info1" indicative of the storage area in the data buffer 242 in which the user data 71 associated with the write command is stored. Note that the entry 81 does not yet include a completion order and a completion state.

The description returns to FIG. 6. Next, the command issuing module 211 stores the issued write command (SQ entry information) in the submission queue 243 ((4) in FIG. 6). The operation of storing a command in the submission queue 243 will be described more specifically. First, the command issuing module 211 writes a command (here, the write command) in a slot in the submission queue 243 indicated by the SQ Tail pointer. The command issuing module 211 adds one to the SQ Tail pointer. When the value obtained by adding one to the SQ Tail pointer reaches the number of slots in the submission queue 243 (that is, the queue size), the command issuing module 211 sets the SQ Tail pointer to zero. Then, the command issuing module 211 writes the updated value of the SQ Tail pointer into an SQ Tail doorbell register of the memory system 3. As described above, the operation of storing a command in the submission queue 243 includes the operation of writing the command in the submission queue 243 and the operation for updating the SQ Tail pointer.

When the SQ tail doorbell register is updated, in response to the update, the command reception module 121 of the memory system 3 acquires the write command from the submission queue 243 ((5) in FIG. 6). Then, the command reception module 121 sends the acquired write command to the write control module 123 ((6) in FIG. 6). Here, the operation of acquiring a command from the submission queue 243 will be described more specifically. First, when there is a difference between the SQ Head pointer and the SQ Tail pointer, the command reception module 121 fetches a command (here, the write command) from a slot in the submission queue 243 indicated by the SQ Head pointer. The command reception module 121 adds one to the SQ Head pointer. When the value obtained by adding one to the SQ Head pointer reaches the number of slots in the submission queue 243, the command reception module 121 sets the SQ Head pointer to zero. As described above, the operation of acquiring a command from the submission queue 243 includes the operation of fetching the command from the submission queue 243 and the operation for updating the SQ Head pointer.

Next, the write control module 123 updates the write management table 63 by using the write command sent by the command reception module 121 ((7) in FIG. 6). Specifically, the write control module 123 adds, to the write management table 63, an entry that includes a command ID, an LBA, a data length, and a data pointer which are designated in the write command. Note that the write control module 123 adds the entry to the write management table 63 after confirming that the LBA designated in the write command is valid, that data can be written to the LBA, or that the data pointer is valid. The data pointer is regarded as valid, for example, in a case where the data pointer does not indicate an inaccessible area in the host 2 and indicates an area corresponding to the data length. Then, the write control module 123 notifies the command reception module 121 that the update of the write management table 63 based on the write command has completed ((8) in FIG. 6).

In response to the notification from the write control module 123, the command reception module 121 stores a first completion (completion indicative of successful termination) for the write command in the completion queue 244 ((9) in FIG. 6). This first completion includes the command ID of the write command. The operation of storing a completion in the completion queue 244 will be described more specifically. First, the command reception module 121 writes the completion in a slot in the completion queue 244 indicated by the CQ Tail pointer. The command reception module 121 adds one to the CQ Tail pointer. When the value obtained by adding one to the CQ Tail pointer reaches the number of slots in the completion queue 244, the command reception module 121 sets the CQ Tail pointer to zero. The command reception module 121 issues an interrupt. By issuing the interrupt, the command reception module 121 notifies the host 2 that there is a new completion to be processed in the completion queue 244. As described above, the operation of storing a completion in the completion queue 244 includes the operation of writing the completion in the completion queue 244, the operation for updating the CQ Tail pointer, and the operation of issuing an interrupt.

Note that in a case where the write command acquired from the submission queue 243 is an inexecutable command, the command reception module 121 may store a completion indicative of an error termination in the completion queue 244 as the first completion.

Next, the command issuing module 211 of the host 2 acquires the first completion for the write command from the completion queue 244 ((10) in FIG. 6). Then, the command issuing module 211 sends the acquired first completion to the write management module 212 ((11) in FIG. 6). Here, the operation of acquiring a completion from the completion queue 244 will be described more specifically. First, the command issuing module 211 fetches the completion from a slot in the completion queue 244 indicated by the CQ Head pointer, in response to an interrupt issued by the command reception module 121 of the memory system 3. The command issuing module 211 adds one to the CQ Head pointer. When the value obtained by adding one to the CQ Head pointer reaches the number of slots in the completion queue 244, the command issuing module 211 sets the CQ Head pointer to zero. The command issuing module 211 writes the updated CQ Head pointer into a CQ head doorbell register of the memory system 3. Then, the command issuing module 211 clears the interrupt received from the memory system 3. As described above, the operation of acquiring a completion from the completion queue 244 includes the operation of fetching the completion from the completion queue 244, the operation for updating the CQ Head pointer, and the operation of clearing the interrupt.

In a case where the first completion is a completion indicative of a successful termination, the write management module 212 receives the first completion from the command issuing module 211 and updates the entry in the locked data list 245 that corresponds to the received first completion ((12) in FIG. 6). Specifically, the write management module 212 assigns, to the received first completion, a sequence number indicating the order of reception. For example, the write management module 212 assigns, to the received first completion, a sequence number that increases by one whenever a first completion for a write command is received from the memory system 3 via the completion queue 244. In addition, the write management module 212 acquires the command ID included in the received first completion. The write management module 212 identifies an entry in the locked data list 245 that includes SQ entry information corresponding to the acquired command ID. Then, the write management module 212 adds, to the identified entry, the assigned sequence number (that is, information indicating the order of reception) and information indicating that the first completion has been received.

In a case where the first completion is a completion indicating an error termination, the write management module 212 unlocks the user data 71 in the data buffer 242 that corresponds to the received first completion ((13) in FIG. 6). Then, the write management module 212 deletes an entry corresponding to the received first completion from the locked data list 245 ((14) in FIG. 6). More specifically, the write management module 212 acquires a command ID included in the received first completion. The write management module 212 identifies an entry in the locked data list 245 that includes SQ entry information corresponding to the acquired command ID. The write management module 212 unlocks the user data 71 by using the data region management information in the identified entry. In addition, in a case where a list of PRP entries or a second and subsequent segments of SGL were created, the write management module 212 also releases an area of the pointer list 246 in which the list or the segments are stored. Then, the write management module 212 deletes the identified entry from the locked data list 245 (that is, deletes the identified entry from the NVRAM 24). Note that the unlocked user data 71 is deleted from the data buffer 242. Specifically, another data may be stored in the storage area in the data buffer 242 in which the unlocked user data 71 is stored.

Figure 8:
FIG. 8 is a diagram illustrating a second example of the locked data list updated in the write operation of FIG. 6.

FIG. 8 illustrates an example of the locked data list 245 in which the entry has been updated in the operation of (12) in FIG. 6. The locked data list 245 includes the updated entry 81.

In the example illustrated in FIG. 8, a completion order "cseq1" indicative of the order of reception of the received first completion and a completion state "completed" indicating that the first completion has been received are added to the entry 81. That is, the entry 81 indicates that the first completion has been received with the completion order "cseq1".

When the update of the locked data list 245 is completed, the write management module 212 returns, to the write request generated from the application or the OS 221, a response indicating that writing is completed in a case where the first completion indicates a successful termination, and returns an error response in a case where the first completion indicates an error termination.

As described above, there may be a case where the application or the OS 221 stores the user data 71 in the RAM 22 and the write management module 212 copies the user data 71 from the RAM 22 to the NVRAM 24. In this case, the application or the OS 221 releases an area in the RAM 22 in which the user data 71 is stored in response to reception of the first completion indicating the error termination and may use the area for another data. The write management module 212 may also release an area in the NVRAM 24 in which the user data 71 is stored.

FIG. 9 is a block diagram illustrating an example of the write operation subsequent to FIG. 6. Here, a case where the total amount of user data 71 requested to be written by write commands that are received by the memory system 3 from the host 2 reaches a specific data unit will be explained. The specific data unit is, for example, a write unit that corresponds to the amount of data that is writable to the NAND flash memory 5 in a single data write operation.

In the memory system 3, after the total amount of user data 71 requested to be written by write commands that are received from the host 2 reaches the specific data unit, the command reception module 121 and the write control module 123 write the user data 71 of the specific data unit into the NAND flash memory 5 and return second completions that correspond to the write commands, respectively, to the host 2. That is, the command reception module 121 and the write control module 123 operate according to a mechanism (i.e., delayed write completion) in which writing in accordance a single write request is not immediately executed but writing in accordance with multiple write commands is executed after the total amount of user data 71 requested to be written by the multiple write requests reaches the specific data unit.

Specifically, the write control module 123 transfers the user data 71 of the write unit from the data buffer 242 to the NAND flash memory 5, and writes (programs) the transferred user data 71 of the write unit into the NAND flash memory 5 ((1) in FIG. 9). Then, in a case where there is a write command for which the corresponding user data 71 is readable from the NAND flash memory 5, the write control module 123 notifies the command reception module 121 of completion of processing in accordance with the write command ((2) in FIG. 9). The write control module 123 notifies the command reception module 121 of completion of processing in accordance with each of the write commands that correspond to the user data 71 of the write unit. The write control module 123 deletes entries that correspond to the write commands, respectively, from the write management table 63 ((3) in FIG. 9). In addition, the write control module 123 adds command IDs of the respective write commands to the command log 53 ((4) in FIG. 9).

Whenever receiving the notification from the write control module 123, the command reception module 121 transmits, to the host 2, a second completion indicating that processing in accordance with a corresponding write command has completed ((5) in FIG. 9). More specifically, the command reception module 121 stores the second completion for the corresponding write command in the completion queue 244 in response to the notification from the write control module 123. The notification from the write control module 123 includes, for example, a command ID of a write command for which processing has completed.

Note that in a case where an error occurs in processing in accordance with a write command, the command reception module 121 transmits a completion indicating the error as a second completion to the host 2.

Next, the command issuing module 211 of the host 2 acquires the second completion from the completion queue 244 ((6) in FIG. 9). Then, the command issuing module 211 sends the acquired second completion to the write management module 212 ((7) in FIG. 9).

The write management module 212 receives the second completion from the command issuing module 211 and unlocks the user data 71 in the data buffer 242 corresponding to the received second completion ((8) in FIG. 9). Then, the write management module 212 deletes the entry corresponding to the received second completion from the locked data list 245 ((9) in FIG. 9). More specifically, the write management module 212 acquires a command ID included in the received second completion. The write management module 212 identifies an entry in the locked data list 245 that includes SQ entry information corresponding to the acquired command ID. By using data region management information in the identified entry, the write management module 212 unlocks the user data 71 which has been written. In addition, in a case where a list of PRP entries or second and subsequent segments of SGL were created, the write management module 212 also releases an area of the pointer list 246 in which the list or the segments are stored. Then, the write management module 212 deletes the identified entry from the locked data list 245 (that is, deletes the identified entry from the NVRAM 24). Note that the unlocked user data 71 is deleted from the data buffer 242. Specifically, another data may be stored in the storage area in the data buffer 242 in which the unlocked user data 71 is stored.

In a case where the second completion indicates an error, the host 2 (specifically, the write management module 212) is regarded as a failure of the memory system 3. The write management module 212 stops processing for the memory system 3 and performs exception processing as the information processing system 1. For example, the write management module 212 deletes any data related to the memory system 3. The data to be deleted includes the user data 71 in the data buffer 242 corresponding to the memory system 3 and the locked data list 245 corresponding to the memory system 3. In addition, the write management module 212 stops at least transmitting a write command to the memory system 3 regarded as failure. Further, the write management module 212 responds to all write requests from the application or the OS 221 with errors.

Figure 10:
FIG. 10 is a diagram illustrating an example of the locked data list updated in the write operation of FIG. 9.

FIG. 10 illustrates an example of the locked data list 245 from which the entry is deleted in the operation of (9) in FIG. 9. The locked data list 245 includes the entry 81 corresponding to the received second completion.

In the example illustrated in FIG. 10, the entry 81 includes the SQ entry information "sqentry_info1", the completion order "cseq1", the data region management information "region_info1", and the completion state "completed". That is, the entry 81 is an entry indicating that the first completion has been received. The entry 81 is deleted in response to receiving the second completion for the corresponding write command (that is, the write command equivalent to the SQ entry information "sqentry_info1") from the memory system 3.

Note that a write command (SQ entry information) stored in the submission queue 243 is cleared, for example, in response to reception of a first completion for the write command. Thus, the SQ entry information equivalent to the write command is stored in the entry of the locked data list 245. Note that, in this case, the write command (SQ entry information) stored in the submission queue 243 of the NVRAM 24 may be stored in the RAM 22.

In addition, the write command stored in the submission queue 243 may not be cleared until the second completion for the write command is received. In this case, instead of the SQ entry information, a pointer indicating the entry of the submission queue 243 is stored in the entry of the locked data list 245. Then, the write command itself stored in the submission queue 243 is used as the SQ entry information. Note that since the write command is not cleared from the submission queue 243, the SQ Head pointer is not updated, and the submission queue 243 likely becomes full. Thus, there is a possibility that another command such as a read command cannot be issued. Therefore, it is desirable that the submission queue 243 is provided as a dedicated submission queue for issuing write commands.

By the above write operation, while the memory system 3 writes user data according to the delayed write completion on the basis of write commands received from the host 2, the host 2 can manage a status of processing corresponding to each of the issued write commands by using the locked data list 245.

Specifically, in the case of transmitting a write command to the memory system 3, the host 2 adds an entry corresponding to the write command to the locked data list 245. The added entry does not include, for example, a completion order and a completion state. Therefore, with the added entry, the host 2 can manage the fact that neither a first completion nor a second completion for the corresponding write command has been received. In other words, with the added entry, the host 2 can manage a state in which the corresponding write command has been issued (transmitted) to the memory system 3 and the first completion has not been received.

After receiving the write command from the host 2 and adding a corresponding entry to the write management table 63, the memory system 3 returns a first completion for the write command to the host 2. The host 2 updates the corresponding entry in the locked data list 245 on the basis of the first completion received from the memory system 3. In the updated entry, for example, a completion order and a completion state are added. Therefore, with the updated entry, the host 2 can manage a state in which the first completion for the corresponding write command has been received and the second completion has not been received. In other words, with the updated entry, the host 2 can manage a state in which the memory system 3 has received the corresponding write command.

In a case where writing of user data corresponding to the write command is completed according to the delayed write completion, the memory system 3 returns the second completion for the write command to the host 2. The host 2 deletes the corresponding entry in the locked data list 245 on the basis of the second completion received from the memory system 3. Therefore, the host 2 can terminate the management related to the corresponding write command by deleting the entry.

In a case where time elapsed from reception of a command exceeds a threshold value, the write control module 123 of the memory system 3 may write user data corresponding to the received write command into the NAND flash memory 5 with padding. Here, writing user data with padding means writing data of the write unit that includes the user data and data for padding. This threshold value is based on, for example, an upper limit of response time of a second completion for the write command expected by the host 2. The time elapsed from the reception of the write command is measured by using, for example, the timer 15. More specifically, in a case where the time elapsed from the reception of the write command exceeds the threshold value, the write control module 123 transfers the user data corresponding to the received write command from the data buffer 242 of the host 2 to the NAND flash memory 5. Then, the write control module 123 writes the transferred user data to the NAND flash memory 5 with padding. Accordingly, the command reception module 121 can notify the second completion for the write command within the time expected by the host 2.

(Shutdown Operation)

Next, an example of a shutdown operation in the information processing system 1 will be described with reference to FIGS. 11 and 12. The shutdown operation is an operation for terminating the operation of the memory system 3 after writing of user data corresponding to all write commands transmitted from the host 2 to the memory system 3 is completed.

Figure 11:
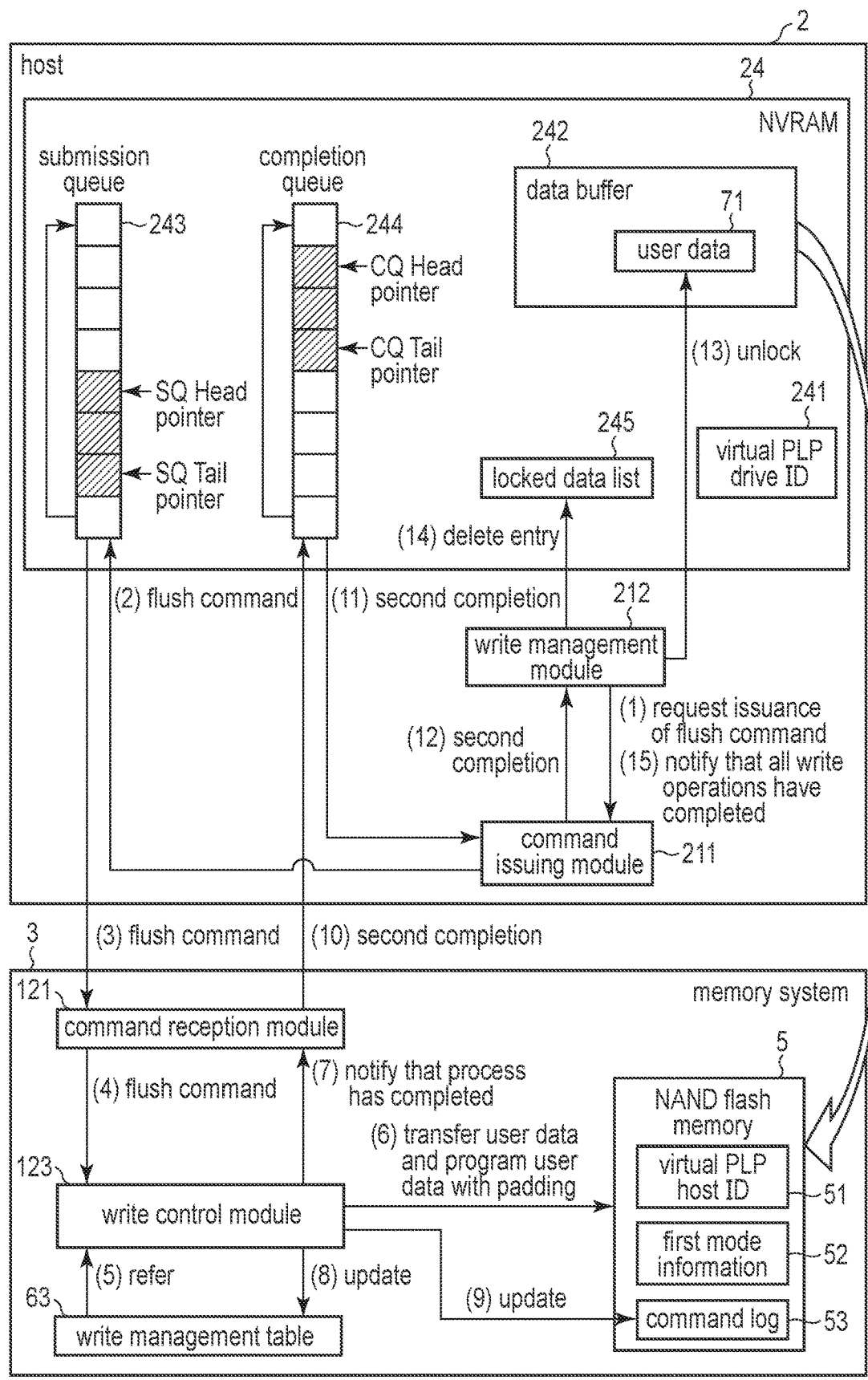
FIG. 11 is a block diagram illustrating an example of a shutdown operation in the information processing system of FIG. 1.

FIG. 11 is a block diagram illustrating an example of the shutdown operation in the information processing system 1. Here, a case where a flush command is used to complete writing of user data 71 corresponding to all write commands transmitted from the host 2 to the memory system 3 will be explained. Note that, for easy understanding, it is assumed that the host 2 has received first completions for all the write commands transmitted from the host 2 to the memory system 3 and has not yet received a second completion for at least one of the write commands.

First, in the host 2, the write management module 212 stops receiving a new I/O request from the application or the like. Then, the write management module 212 requests the command issuing module 211 to issue a flush command ((1) in FIG. 11). The command issuing module 211 issues the flush command in accordance with the request from the write management module 212 and stores the flush command in the submission queue 243 ((2) in FIG. 11).

Next, in the memory system 3, the command reception module 121 acquires the flush command from the submission queue 243 ((3) in FIG. 11). The command reception module 121 sends the acquired flush command to the write control module 123 ((4) in FIG. 11).

By using the write management table 63, the write control module 123 determines whether there is user data 71 to be written into the NAND flash memory 5 in accordance with the flush command received from the command reception module 121 ((5) in FIG. 11). Specifically, in a case where the write management table 63 includes at least one entry, the write control module 123 determines that there is user data 71 to be written into the NAND flash memory 5. In a case where the write management table 63 does not include any entry, the write control module 123 determines that there is no user data 71 to be written into the NAND flash memory 5.

In a case where there is user data 71 to be written into the NAND flash memory 5, the write control module 123 transfers the user data 71 from the data buffer 242 to the NAND flash memory 5, and writes the transferred user data 71 with padding into the NAND flash memory 5 ((6) in FIG. 11). Then, when there is a write command for which corresponding user data 71 becomes readable from the NAND flash memory 5, the write control module 123 notifies the command reception module 121 of completion of processing in accordance with the write command ((7) in FIG. 11). The write control module 123 notifies the command reception module 121 of completion of processing in accordance with each of one or more write commands that correspond to the written user data 71. The write control module 123 deletes an entry corresponding to each of the one or more write commands from the write management table 63 ((8) in FIG. 11). In addition, the write control module 123 adds a command ID of each of the one or more write commands to the command log 53 ((9) in FIG. 11).

Whenever receiving a notification from the write control module 123, the command reception module 121 stores, in the completion queue 244, a second completion indicating that processing in accordance with a corresponding write command has completed ((10) in FIG. 11).

As described above, in the memory system 3, writing of the user data 71 corresponding to all the write commands that are transmitted from the host 2 to the memory system 3 is completed in accordance with the flush command. Accordingly, the second completions are returned to the host 2 for all the write commands.

Subsequent operations (11) to (14) in FIG. 11 in the host 2 are similar to the operations (6) to (9) in the write operation described above with reference to FIG. 9. When the second completions have been received for all the write commands transmitted from the host 2 to the memory system 3, all the entries in the locked data list 245 are deleted. That is, the locked data list 245 becomes empty. The write management module 212 determines that writing of the user data 71 corresponding to all the write commands transmitted from the host 2 to the memory system 3 is completed on the basis of the fact that all the entries in the locked data list 245 have been deleted. Then, the write management module 212 notifies the command issuing module 211 that writing of the user data 71 corresponding to all the write commands has completed ((15) in FIG. 11).

FIG. 12 illustrates an example of the shutdown operation subsequent to FIG. 11.

In a case where it is notified that writing of the user data 71 corresponding to all the write commands has completed, the command issuing module 211 transmits a shutdown instruction to the memory system 3 via the submission queue 243 ((1) in FIG. 12).

In the memory system 3, the command reception module 121 receives the shutdown instruction from the host 2. The command reception module 121 sends the received shutdown instruction to the mode control module 122 ((2) in FIG. 12).

The mode control module 122 makes the operation mode of the memory system 3 transition from the virtual PLP drive mode to the normal drive mode in accordance with the shutdown instruction received from the command reception module 121. Then, the mode control module 122 updates the first mode information 52 in the NAND flash memory 5 so as to indicate the normal drive mode ((3) in FIG. 12).

Further, in accordance with the shutdown instruction, the mode control module 122 deletes the virtual PLP host ID 51 of the host 2 stored in the NAND flash memory 5 ((4) in FIG. 12).

Thereafter, the command reception module 121 notifies the command issuing module 211 of the host 2 that the shutdown has completed ((5) in FIG. 12).

Receiving the notification, the command issuing module 211 deletes the virtual PLP drive ID 241 of the memory system 3 stored in the NVRAM 24 ((6) in FIG. 12). Then, the command issuing module 211 deletes the submission queue 243, the completion queue 244, and the locked data list 245 that are stored in the NVRAM 24 ((7) in FIG. 12). For example, the command issuing module 211 releases storage areas in the NVRAM 24 in which the virtual PLP drive ID 241 and the locked data list 245 are stored.

With the shutdown operation described above, the host 2 can make the memory system 3 transition to the normal drive mode after writing of the user data corresponding to all the write commands transmitted from the host 2 to the memory system 3 is completed. In addition, data used for operating the memory system 3 in the virtual PLP drive mode (more specifically, the virtual PLP drive ID 241, the locked data list 245, the virtual PLP host ID 51) can be deleted. Therefore, the operation of the memory system 3 can be properly terminated in accordance with the shutdown instruction.

(Start Operation)

Next, a start operation in the information processing system 1 will be described. The start operation may include an unbind operation and a recovery operation for recovering the memory system 3 in the case of starting after improper termination of the memory system 3, the case of unintentional restart of the memory system 3, or the case of starting after improper termination of the host 2. Here, the improper termination of the memory system 3 means that the memory system 3 terminates the operation before completing writing of user data corresponding to all write commands received by the memory system 3. The unintended restart of the memory system 3 means that the memory system 3 is restarted without completing the shutdown operation described above. The improper termination of the host 2 means that the host 2 terminates the operation before the memory system 3 completes writing of user data corresponding to all write commands issued by the host 2 to the memory system 3.

The unbind operation is, for example, an operation for forcibly returning the memory system 3 from the virtual PLP drive mode to the normal drive mode in a case where there is no writing of user data into the memory system 3 that has failed to complete because of the improper termination or the unintentional restart of the memory system 3. The recovery operation is an operation for recovering writing of user data into the memory system 3 that has failed to complete because of the improper termination or the unintentional restart of the memory system 3, by using data stored in the NVRAM 24. Specific examples of the unbind operation and the recovery operation will be described below.

(Unbind Operation)

FIG. 13 is a block diagram illustrating an example of the unbind operation in the information processing system 1. Here, it is assumed that the memory system 3 operating in the virtual PLP drive mode was improperly terminated immediately before the current start or is unintentionally restarted. In this case, the memory system 3 is still operating in the virtual PLP drive mode even after the current start. In addition, it is assumed that there is no writing of user data to the memory system 3 that has failed to complete because of the improper termination or the unintentional restart of the memory system 3. That is, it is assumed that an entry indicating that a first completion has been received is not included in the locked data list 245.

First, the recovery control module 213 of the host 2 determines whether the drive ID of the memory system 3 connected to the host 2 matches the virtual PLP drive ID 241 stored in the NVRAM 24 ((1) in FIG. 13).

In a case where the drive ID of the memory system 3 is different from the virtual PLP drive ID 241 in the NVRAM 24, the memory system 3 is estimated to be operating in the virtual PLP drive mode for another host different from the host 2. Therefore, the host 2 does not access the memory system 3 until the memory system 3 returns to the normal drive mode. For example, the memory system 3 returns from the virtual PLP drive mode to the normal drive mode by performing the unbind operation with said another host in accordance with an operation by an operator of the host 2.

Note that the virtual PLP drive ID 241 does not match the drive ID of the memory system 3 in a case where the NVRAM 24 of the host 2 fails and is replaced and all data stored in the NVRAM 24 is lost accordingly, or in a case where another host fails and cannot be repaired and the memory system 3 is connected to the host 2 accordingly. Also in such cases, for example, in accordance with an operation by an operator of the host 2, the host 2 issues a first mode release command to the memory system 3, thereby returning the memory system 3 to the normal mode. Then, the host 2 makes the memory system 3 transition to the virtual PLP drive mode by the procedure described with reference to FIG. 5.

In a case where the drive ID of the memory system 3 matches the virtual PLP drive ID 241 in the NVRAM 24, that is, in a case where the drive ID of the memory system 3 is stored in the NVRAM 24, the recovery control module 213 determines whether the locked data list 245 in the NVRAM 24 includes an entry indicating that a first completion has been received ((2) in FIG. 13). The locked data list 245 is a locked data list associated with the virtual PLP drive ID 241 of the memory system 3.

The entry indicating that the first completion has been received is, for example, an entry including a completion order and a completion state indicating that a first completion has been received. In a case where the entry indicating that the first completion has been received is not included in the locked data list 245, the recovery control module 213 determines that there is no writing of user data into the memory system 3 that has failed to complete because of the improper termination or the unintentional restart of the host 2 or the memory system 3. In a case where the entry indicating that the first completion has been received is included in the locked data list 245, the recovery control module 213 determines that there is writing of user data into the memory system 3 that has failed to complete, despite a successful response to a write request of the application or the OS 221, because of the improper termination or the unintentional restart of the memory system 3.

As described above, in the example illustrated in FIG. 13, it is assumed that an entry indicating that a first completion has been received is not included in the locked data list 245. In this case, the recovery control module 213 deletes from the NVRAM 24 data having been related to the memory system 3 before the improper termination. The data to be deleted includes a write command stored in the submission queue 243 (SQ entry information), a completion stored in the completion queue 244, the locked data list 245, the pointer list 246, and the user data 71 remaining in the data buffer 242. The recovery control module 213 may use the memory system 3 in the virtual PLP drive mode by re-creating these data after the recovery process is completed. The recovery control module 213 requests the command issuing module 211 to issue a first mode release command ((3) in FIG. 13). Then, the recovery control module 213 deletes the virtual PLP drive ID 241 of the memory system 3 stored in the NVRAM 24 ((4) in FIG. 13).

The command issuing module 211 transmits a first mode release command to the memory system 3 in accordance with the request from the recovery control module 213 ((5) in FIG. 13).

In the started (or restarted) memory system 3, the mode control module 122 determines whether the host ID of the host 2 connected to the memory system 3 matches the virtual PLP host ID 51 stored in the NAND flash memory 5 ((6) in FIG. 13). In addition, the mode control module 122 determines whether the memory system 3 is set in the normal drive mode or the virtual PLP drive mode by using the first mode information 52 stored in the NAND flash memory 5 ((7) in FIG. 13). As described above, in the example illustrated in FIG. 13, it is assumed that the memory system 3 is set in the virtual PLP drive mode.

In a case where the host ID of the host 2 is different from the virtual PLP host ID 51 in the NAND flash memory 5, the memory system 3 is estimated to be operating in the virtual PLP drive mode for another host different from the host 2. In that case, for example, the command reception module 121 waits for a first mode release command from said another host.

In a case where the host ID of the host 2 matches the virtual PLP host ID 51 in the NAND flash memory 5, the command reception module 121 receives the first mode release command from the host 2. The command reception module 121 sends the received first mode release command to the mode control module 122 ((8) in FIG. 13).

The mode control module 122 makes the memory system 3 transition from the virtual PLP drive mode to the normal drive mode in accordance with the first mode release command received from the command reception module 121. Then, the mode control module 122 updates the first mode information 52 in the NAND flash memory 5 so as to indicate the normal drive mode ((9) in FIG. 13). Further, in accordance with the first mode release command, the mode control module 122 deletes the virtual PLP host ID 51 of the host 2 stored in the NAND flash memory 5 ((10) in FIG. 13).

With the above unbind operation, in a case where the memory system 3 operating in the virtual PLP drive mode was improperly terminated immediately before the current start or a case where the memory system 3 operating in the virtual PLP drive mode is connected to another host 2 different from the previous host 2, or in a case where data that was stored in the NVRAM 24 by the host 2 and was to be used for operating the memory system 3 in the virtual PLP drive mode (more specifically, the virtual PLP drive ID 241 and the locked data list 245) is lost, the host 2 can forcibly return the memory system 3 from the virtual PLP drive mode to the normal drive mode. The memory system 3 that has transitioned to the normal drive mode may operate in the virtual PLP drive mode again for the host 2 by the bind operation with the host 2. Alternatively, the memory system 3 that has transitioned to the normal drive mode may operate in the virtual PLP drive mode for another host different from the host 2 by the bind operation with said another host. Note that the unbind operation may be performed at any time which is not limited to the start of the memory system 3.

(Recovery Operation)

FIG. 14 is a block diagram illustrating an example of the recovery operation in the information processing system 1. Here, it is assumed that the memory system 3 operating in the virtual PLP drive mode was improperly terminated immediately before the current start or is unintentionally restarted. In this case, the memory system 3 is still operating in the virtual PLP drive mode even after the current start. In addition, it is assumed that there is writing of user data into the memory system 3 that has failed to complete because of the improper termination or the unintentional restart of the memory system 3. That is, it is assumed that an entry indicating that a first completion has been received is included in the locked data list 245.

First, the recovery control module 213 of the host 2 determines whether the drive ID of the memory system 3 connected to the host 2 matches the virtual PLP drive ID 241 stored in the NVRAM 24 ((1) in FIG. 14).

In a case where the drive ID of the memory system 3 is different from the virtual PLP drive ID 241 in the NVRAM 24, the memory system 3 is estimated to be operating in the virtual PLP drive mode for another host different from the host 2. Therefore, the host 2 does not access the memory system 3 until the memory system 3 returns to the normal drive mode. In the memory system 3, for example, the recovery operation is performed with said another host.

In a case where the drive ID of the memory system 3 matches the virtual PLP drive ID 241 in the NVRAM 24, the recovery control module 213 determines whether the locked data list 245 in the NVRAM 24 includes an entry indicating that a first completion has been received ((2) in FIG. 14).

As described above, in the example illustrated in FIG. 14, it is assumed that the locked data list 245 includes an entry indicating that a first completion has been received. In this case, the recovery control module 213 requests the command issuing module 211 to issue a second mode transition command ((3) in FIG. 14). In addition, the recovery control module 213 newly creates a submission queue 243 and a completion queue 244 in the NVRAM 24.

In response to the request from the recovery control module 213, the command issuing module 211 transmits a second mode transition command to the memory system 3 via the newly created submission queue 243 or via the submission queue dedicated to management commands ((4) in FIG. 14).

In the started memory system 3, the mode control module 122 determines whether the host ID of the host 2 connected to the memory system 3 matches the virtual PLP host ID 51 stored in the NAND flash memory 5 ((5) in FIG. 14). In addition, the mode control module 122 determines whether the memory system 3 is set in the normal drive mode or the virtual PLP drive mode by referring to the first mode information 52 stored in the NAND flash memory 5 ((6) in FIG. 14). As described above, in the example illustrated in FIG. 14, it is assumed that the memory system 3 is set in the virtual PLP drive mode.

In a case where the host ID of the host 2 is different from the virtual PLP host ID 51 in the NAND flash memory 5, it is considered that the host 2 is performing an improper operation, and thus the memory system 3 notifies the host 2 that the second mode transition command has caused an error.

In a case where the host ID of the host 2 matches the virtual PLP host ID 51 in the NAND flash memory 5, the command reception module 121 sends the received second mode transition command to the mode control module 122 ((7) in FIG. 14).

The mode control module 122 makes the memory system 3 transition from the normal write mode to the recovery write mode in accordance with the second mode transition command received from the command reception module 121. The command reception module 121 notifies the host 2 that the second mode transition command has successfully completed and the memory system 3 has transitioned to the recovery write mode ((8) in FIG. 14).

Figure 15:
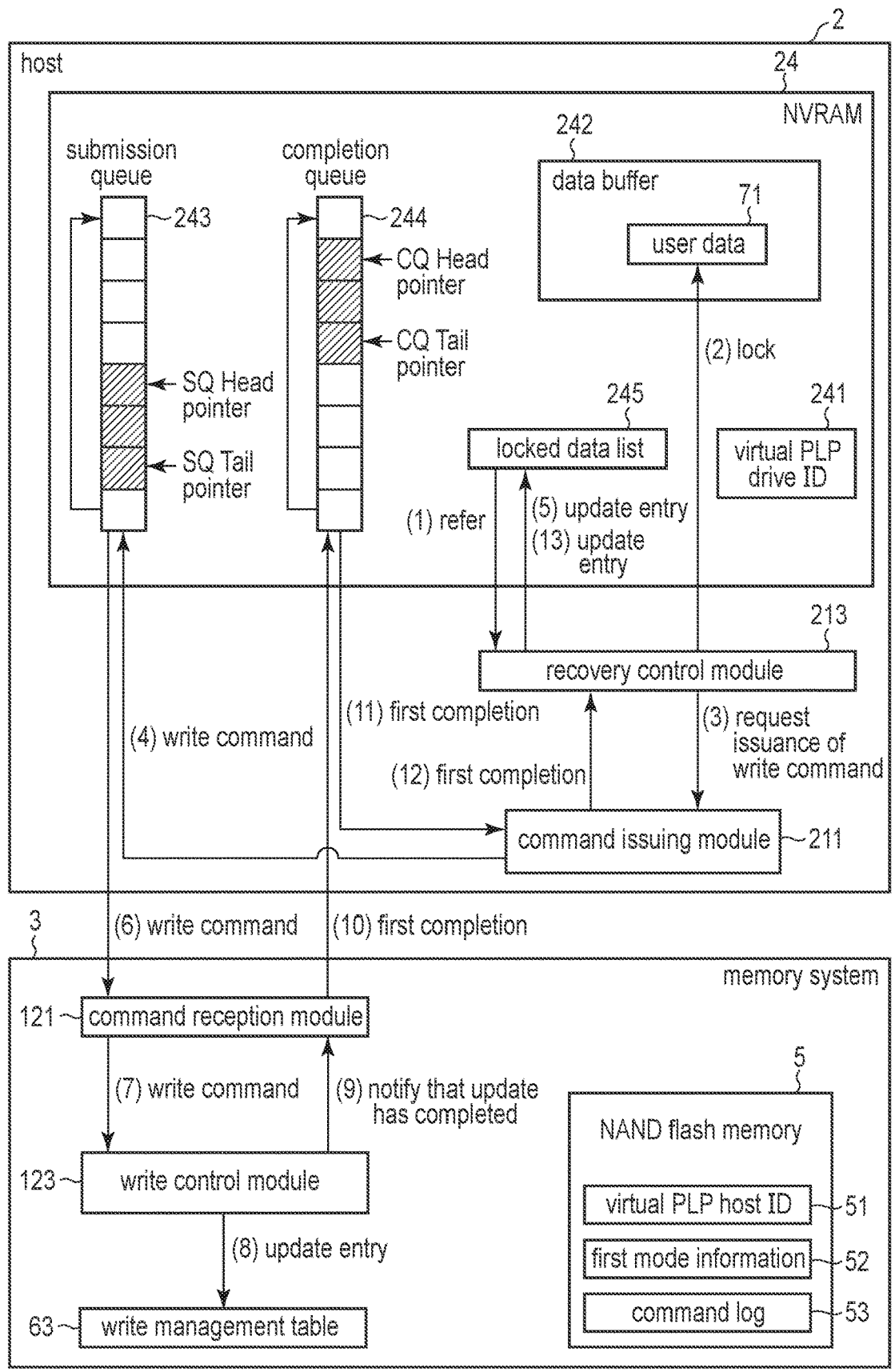
FIG. 15 is a block diagram illustrating an example of the recovery operation subsequent to FIG. 14.

FIG. 15 illustrates an example of the recovery operation subsequent to FIG. 14. In the recovery operation illustrated in FIG. 15, the host 2 requests again the memory system 3, which has transitioned to the recovery write mode, to perform writing of user data that has failed to complete because of the improper termination or the unintentional restart.

Specifically, in the locked data list 245 that is associated with the virtual PLP drive ID 241 of the memory system 3, the recovery control module 213 of the host 2 identifies N entries each indicating that a first completion has been received ((1) in FIG. 15). Note that N is an integer of one or more.

The recovery control module 213 selects an entry from the N entries in ascending order of the completion order by using the completion order included in each of the identified N entries. Hereinafter, the selected entry is also referred to as a target entry. In the subsequent operations illustrated in FIG. 15, the N entries are used as the target entry one by one in ascending order of the completion order.

The recovery control module 213 locks corresponding user data 71 in the data buffer 242 by using data region management information included in the target entry ((2) in FIG. 15). Then, the recovery control module 213 requests the command issuing module 211 to issue a corresponding write command by using SQ entry information included in the target entry ((3) in FIG. 15).

Note that in a case where the locked data list 245 includes an entry indicating that a first completion is not received, the recovery control module 213 deletes the entry. The entry indicating that the first completion is not received is, for example, an entry that does not include a completion order and a completion state. Since the first completion is not received, the recovery control module 213 determines that a write command corresponding to this entry has not been received by the memory system 3. In addition, since the first completion is not received, completion of writing is not notified to the application or the like that requested writing of user data corresponding to this entry. Therefore, it is not necessary to transmit a write command, which corresponds to the entry indicating that the first completion is not received, to the memory system 3 again. Therefore, the recovery control module 213 deletes the entry indicating that the first completion is not received from the locked data list 245.

The command issuing module 211 stores, in the submission queue 243, a write command that is equivalent to the SQ entry information in the target entry in accordance with the request for issuing the write command by the recovery control module 213 ((4) in FIG. 15).

Then, the recovery control module 213 deletes the completion order and the completion state in the target entry ((5) in FIG. 15). Accordingly, the target entry indicates a state in which the corresponding write command is issued (transmitted) to the memory system 3 and the first completion thereof is not received.

Subsequent operations from (6) to (10) in FIG. 15 are similar to the operations from (5) to (9) in the write operation described above with reference to FIG. 6. That is, the command reception module 121 and the write control module 123 of the memory system 3 update the write management table 63 on the basis of a write command acquired from the submission queue 243, and store a first completion in the completion queue 244.

Then, the command issuing module 211 of the host 2 acquires the first completion for the write command from the completion queue 244 ((11) in FIG. 15). The command issuing module 211 sends the acquired first completion to the recovery control module 213 ((12) in FIG. 15).

The recovery control module 213 receives the first completion from the command issuing module 211, and updates an entry in the locked data list 245 corresponding to the received first completion ((13) in FIG. 15). Specifically, the write management module 212 adds a sequence number indicating the order in which the completion has been received and information indicating that the first completion has been received, to the entry corresponding to the received first completion.

By the recovery operation illustrated in FIG. 15 described above, the host 2 can transmit a write command for requesting writing of corresponding user data to the memory system 3 again in ascending order of the completion order by using the N entries in the locked data list 245 each indicating that a first completion has been received. Therefore, it is possible to reproduce transmission of write commands in which processing has failed to complete because of the improper termination or the unintentional restart of the memory system 3 in consideration of the order of the reception of the write commands by the memory system 3.

Since the memory system 3 is operating in the recovery write mode, the write control module 123 of the memory system 3 ensures that corresponding user data is written in the same order of reception of the write commands.

FIG. 16 illustrates an example of the recovery operation subsequent to FIG. 15.

After all the N write commands that respectively correspond to the N target entries are transmitted to the memory system 3, the recovery control module 213 of the host 2 requests the command issuing module 211 to issue a flush command ((1) in FIG. 16). The command issuing module 211 issues a flush command in accordance with the request by the recovery control module 213 and stores the flush command in the submission queue 243 ((2) in FIG. 16).

Subsequent operations (3) to (10) in FIG. 16 are similar to the operations (3) to (10) in the shutdown operation described above with reference to FIG. 11. That is, the command reception module 121 and the write control module 123 of the memory system 3 complete writing of user data 71 corresponding to all the write commands transmitted from the host 2 to the memory system 3 in accordance with the flush command acquired from the submission queue 243, and store second completions in the completion queue 244.

Next, the command issuing module 211 of the host 2 acquires the second completion from the completion queue 244 ((11) in FIG. 16). Then, the command issuing module 211 sends the acquired second completion to the recovery control module 213 ((12) in FIG. 16).

The recovery control module 213 receives the second completion from the command issuing module 211, and unlocks user data 71 in the data buffer 242 corresponding to the received second completion ((13) in FIG. 16). Then, the recovery control module 213 deletes an entry corresponding to the received second completion from the locked data list 245 ((14) in FIG. 16).

When the second completions have been received for all the write commands transmitted from the host 2 to the memory system 3, all the entries in the locked data list 245 are deleted. That is, the locked data list 245 becomes empty. The recovery control module 213 determines that writing of the user data 71 corresponding to all the write commands transmitted from the host 2 to the memory system 3 is completed on the basis of the fact that all the entries in the locked data list 245 have been deleted. Then, the recovery control module 213 notifies the command issuing module 211 that writing of the user data corresponding to all the write commands has completed ((15) in FIG. 16).

In response to the notification by the recovery control module 213, the command issuing module 211 transmits a second mode release command to the memory system 3 via the submission queue 243 ((16) in FIG. 16).

The command reception module 121 of the memory system 3 receives the second mode release command from the host 2. The command reception module 121 sends the received second mode release command to the write control module 123 ((17) in FIG. 16).

The write control module 123 makes the memory system 3 transition from the recovery write mode to the normal write mode in accordance with the second mode release command. Note that the first operation mode of the memory system 3 remains in the virtual PLP drive mode.

By the recovery operation described above, it is possible to complete writing of the user data that has failed to complete because of the improper termination or the unintentional restart of the memory system 3. That is, by using the locked data list 245 that manages processing status of issued write commands, the host 2 can recover the incomplete writing to the memory system 3 that was improperly terminated or unintentionally restarted. Then, the host 2 can start receiving a new I/O request from the application. The new I/O request is a new data read request or a new data write request for the memory system 3. That is, the host 2 can newly issue a read command or a write command that corresponds to the received new I/O request, to the memory system 3. Incidentally, also in a case where not only the memory system 3 but also the host 2 was improperly terminated or unintentionally restarted, a similar recovery operation can be performed since the locked data list 245 is stored in a nonvolatile manner.

In addition, similarly to the write operation described above with reference to FIG. 9, the write control module 123 may write user data corresponding to a received write command into the NAND flash memory 5 with padding in a case where time elapsed from reception of the write command exceeds a threshold value. In this case, since the host 2 can receive a second completion within an expected time, the recovery control module 213 and the command issuing module 211 do not need to transmit a flush command to the memory system 3.

Note that the recovery control module 213 and the command issuing module 211 may transmit the second mode release command to the memory system 3 at the time of receiving first completions for all the write commands that were transmitted from the host 2 to the memory system 3. That is, in a case where the first completions have been received for all the transmitted write commands, the recovery control module 213 may determine that writing of the user data that has failed to complete because of the improper termination or the unintentional restart of the memory system 3 has been recovered. In this case, the recovery control module 213 and the command issuing module 211 transmit the second mode release command to the memory system 3 via the submission queue 243 in response to the reception of the first completions for all the transmitted write commands, and then start receiving a new I/O request from the application.

Next, the procedure of processes executed in the host 2 and the memory system 3 will be described with reference to flowcharts of FIGS. 17 to 30.

(Bind Process in Host 2)

Figure 17:
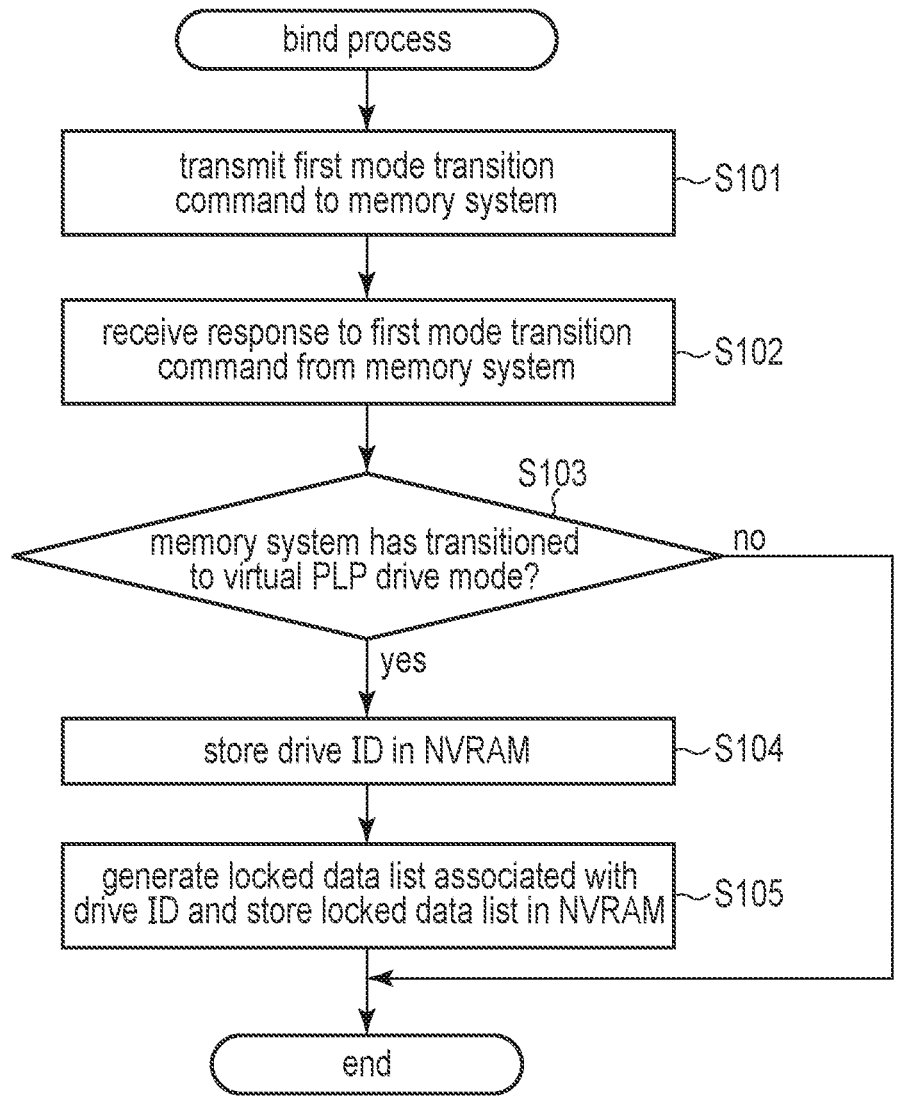
FIG. 17 is a flowchart illustrating an example of the procedure of a bind process executed in the information processing apparatus of the embodiment.

FIG. 17 is a flowchart illustrating an example of the procedure of a bind process executed by the CPU 21 of the host 2. The bind process is a process for performing initial setting for operating the memory system 3, which is connected to the host 2, in the virtual PLP drive mode. The CPU 21 executes the bind process, for example, in a case where the memory system 3 is connected to the host 2.

First, the CPU 21 transmits a first mode transition command to the memory system 3 (step S101). The first mode transition command is a command for making the memory system 3 transition to the virtual PLP drive mode. The first mode transition command includes the host ID.

Then, the CPU 21 receives a response to the first mode transition command from the memory system 3 (step S102). The received response includes information indicating whether the memory system 3 has transitioned to the virtual PLP drive mode. In addition, the received response may include the drive ID of the memory system 3. The CPU 21 determines whether the memory system 3 has transitioned to the virtual PLP drive mode on the basis of the received response (step S103).

In a case where the memory system 3 does not transition to the virtual PLP drive mode (no in step S103), the CPU 21 ends the bind process. For example, in a case where the memory system 3 has already transitioned to the virtual PLP drive mode by a bind process by another host different from the host 2, the memory system 3 returns, to the host 2, a response indicating that the memory system 3 does not transition to the virtual PLP drive mode with respect to the first mode transition command from the host 2. In this case, the CPU 21 ends the bind process.

In a case where the memory system 3 has transitioned to the virtual PLP drive mode (yes in step S103), the CPU 21 stores the drive ID of the memory system 3 as the virtual PLP drive ID 241 in the NVRAM 24 (step S104). For example, the CPU 21 stores, in the NVRAM 24, the drive ID that is included in the response received from the memory system 3. Alternatively, the CPU 21 may store, in the NVRAM 24, the drive ID obtained through a connection process or an authentication process with the memory system 3. Then, the CPU 21 generates a locked data list 245 associated with the drive ID of the memory system 3, stores the locked data list 245 in the NVRAM 24 (step S105), and ends the bind process.

With the above bind process, the CPU 21 can perform initial setting for operating the memory system 3 connected to the host 2 in the virtual PLP drive mode. Specifically, in a case where the memory system 3 has transitioned to the virtual PLP drive mode in accordance with the first mode transition command, the CPU 21 can store the virtual PLP drive ID 241 and the locked data list 245 that correspond to the memory system 3, in the NVRAM 24.

(Bind Process in Memory System 3)

FIG. 18 is a flowchart illustrating an example of the procedure of a bind process executed by the CPU 12 of the memory system 3. The CPU 12 executes the bind process in response to reception of a first mode transition command from the host 2.

First, the CPU 12 acquires a host ID included in the first mode transition command received from the host 2 (step S201). The host ID included in the first mode transition command is referred to as a first host ID.

The CPU 12 determines whether another host ID different from the first host ID is already registered in the memory system 3 (step S202). Specifically, the CPU 12 determines whether another host ID different from the first host ID is stored as the virtual PLP host ID 51 in the NAND flash memory 5. In a case where another host ID different from the first host ID is stored in the NAND flash memory 5, the CPU 12 determines that said another host ID different from the first host ID is already registered in the memory system 3. In a case where no host ID is stored in the NAND flash memory 5 or a case where the first host ID is stored in the NAND flash memory 5, the CPU 12 determines that another host ID different from the first host ID is not registered in the memory system 3.

In a case where another host ID different from the first host ID is already registered in the memory system 3, the CPU 12 notifies the host 2 of an error (step S203), and ends the bind process. That is, since the memory system 3 is already operating in the virtual PLP drive mode for another host having the registered host ID, the CPU 12 notifies the host 2 that transition to the virtual PLP drive mode cannot be made in accordance with the received first mode transition command.

In a case where another host ID different from the first host ID is not registered in the memory system 3, the CPU 12 stores the first host ID in the NAND flash memory 5 (step S204). The CPU 12 makes the memory system 3 transition from the normal drive mode to the virtual PLP drive mode (step S205). Specifically, the CPU 12 replaces the first mode information 52 indicative of the normal drive mode in the NAND flash memory 5 with the first mode information 52 indicative of the virtual PLP drive mode. Then, the CPU 12 transmits, to the host 2, a response including information indicating the transition to the virtual PLP drive mode (mode transition completion) (step S206). The response may further include the drive ID of the memory system 3.

With the above bind process, in the case of receiving the first mode transition command from the host 2, the memory system 3 can transition from the normal drive mode to the virtual PLP drive mode when not operating in the virtual PLP drive mode for another host.

(Process in Host 2 for Writing User Data to Memory System 3)

Figure 19:
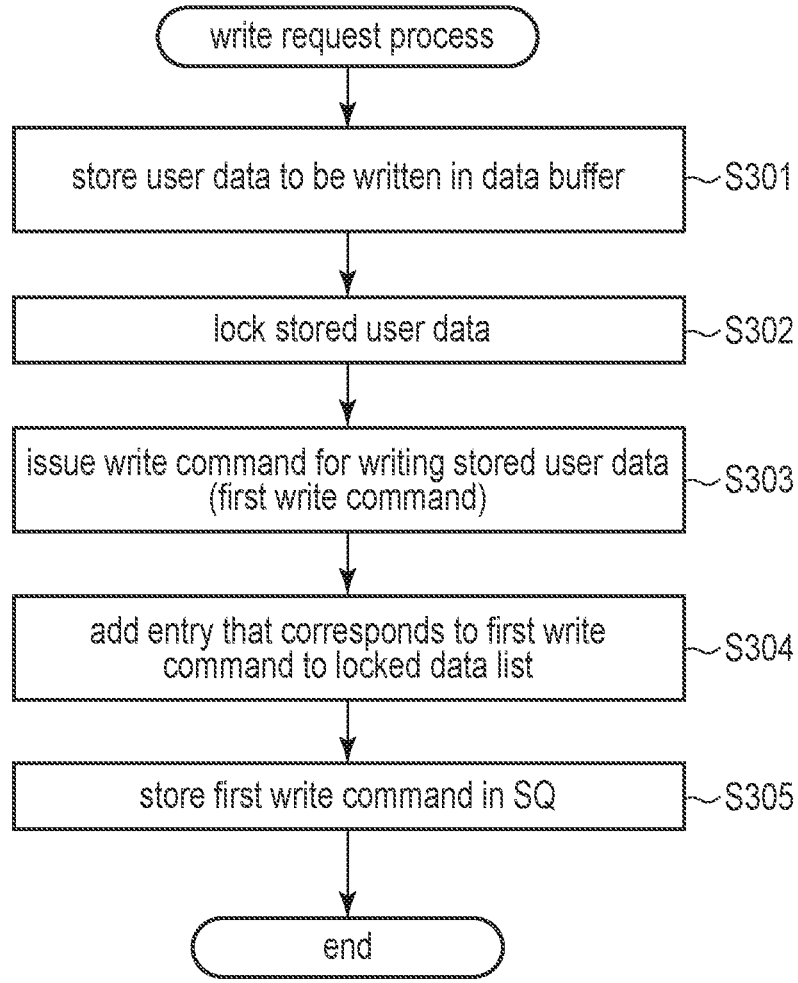
FIG. 19 is a flowchart illustrating an example of the procedure of a write request process executed in the information processing apparatus of the embodiment.

FIG. 19 is a flowchart illustrating an example of the procedure of a write request process executed by the CPU 21 of the host 2. The write request process is a process in which the host 2 requests the memory system 3 to write user data. The CPU 21 executes the write request process after making the memory system 3 transition to the virtual PLP drive mode by the bind process described above with reference to FIG. 17, for example.

First, the CPU 21 stores user data to be written into the NAND flash memory 5, in the data buffer 242 (step S301). Incidentally, in a case where the user data to be written into the NAND flash memory 5 is stored in the RAM 22, the CPU 21 may copy the user data to the data buffer 242. Then, the CPU 21 locks the user data stored in the data buffer 242 (step S302). More specifically, the CPU 21 locks the state of a storage area (for example, a page) used by the driver 222 in which the user data is stored by using a function of the OS 221 being executed. Accordingly, the storage area in which the user data is stored is prevented from being unintentionally released.

The CPU 21 issues a write command for writing the user data stored in the data buffer 242 into the NAND flash memory 5 (hereinafter, referred to as a first write command) (step S303).

Next, the CPU 21 adds an entry corresponding to the first write command to the locked data list 245 (step S304). The added entry includes, for example, SQ entry information and data region management information that correspond to the first write command. The SQ entry information corresponding to the first write command is information representing the first write command. More specifically, the SQ entry information corresponding to the first write command is information stored in the submission queue 243 to make the memory system 3 execute a process in accordance with the first write command. In addition, the data region management information corresponding to the first write command is information capable of identifying the storage area in the data buffer 242 in which the user data corresponding to the first write command is stored.

Then, the CPU 21 stores the first write command (that is, the SQ entry information representing the first write command) in the submission queue 243 (step S305).

Note that the CPU 21 may execute the procedure of step S304 of adding the entry corresponding to the first write command to the locked data list 245 after the procedure of step S305 of storing the first write command in the submission queue 243. In addition, the CPU 21 may execute the procedure of step S304 and the procedure of step S305 in parallel.

With the above write request process, the CPU 21 can request the memory system 3 to write the user data stored in the data buffer 242. In addition, the CPU 21 can manage information regarding the writing that has been requested to the memory system 3 (that is, information related to the issued write command) by using the locked data list 245.

(Processing for Writing User Data in Memory System 3)

Figure 20:
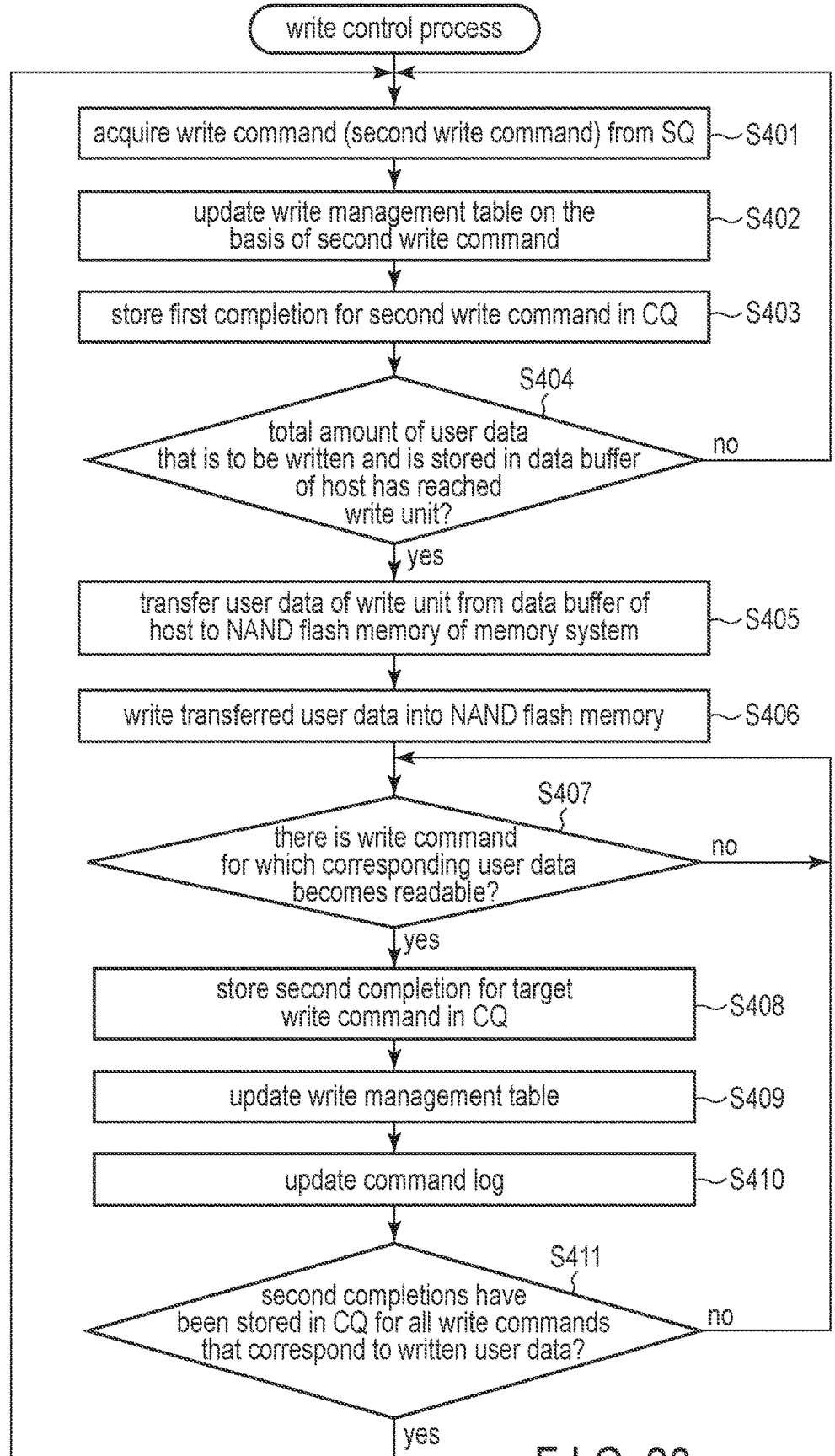
FIG. 20 is a flowchart illustrating an example of the procedure of a write control process executed in the memory system of FIG. 1.

FIG. 20 is a flowchart illustrating an example of the procedure of a write control process executed by the CPU 12 of the memory system 3. The write control process is a process for receiving a write command issued by the host 2 and controlling writing of user data corresponding to write commands that have been received. Here, a case where commands received from the submission queue 243 of the host 2 by the CPU 12 are only write commands will be explained for easy understanding.

First, the CPU 12 acquires a write command (hereinafter, referred to as a second write command) from the submission queue 243 (step S401). The CPU 12 updates the write management table 63 on the basis of the second write command (step S402). Specifically, the CPU 12 acquires, for example, a command ID, an LBA, a data length, and a data pointer from the second write command. The CPU 12 adds, to the write management table 63, an entry that indicates the acquired command ID, LBA, data length, and data pointer.

Then, the CPU 12 stores a first completion for the second write command in the completion queue 244 (step S403). The first completion for the second write command includes the command ID of the second write command.

Next, the CPU 12 determines whether the total amount of user data that is to be written and is stored in the data buffer 242 of the host 2 has reached the write unit (step S404). The CPU 12 acquires the total amount of user data that is to be written and is stored in the data buffer 242 by using the write management table 63.

In a case where the total amount of user data that is to be written and is stored in the data buffer 242 has not reached the write unit (no in step S404), the processing by the CPU 12 returns to step S401. That is, the CPU 12 continues processing for receiving a new write command.

In a case where the total amount of user data that is to be written and is stored in the data buffer 242 has reached the write unit (yes in step S404), the CPU 12 transfers the user data of the write unit from the data buffer 242 of the host 2 to the NAND flash memory 5 of the memory system 3 (step S405). The CPU 12 writes the transferred user data into the NAND flash memory 5 (step S406).

Next, the CPU 12 determines whether there is a write command for which corresponding user data becomes readable from the NAND flash memory 5 (step S407). In a case where there is no write command for which corresponding user data becomes readable (no in step S407), the processing by the CPU 12 returns to step S407. That is, since the CPU 12 has not yet notified the host 2 of a second completion indicating that writing of user data in accordance with a write command is completed, the processing by the CPU 12 returns to step S407.

In a case where there is a write command for which corresponding user data becomes readable (yes in step S407), the CPU 12 stores a second completion for the write command in the completion queue 244 (step S408). Hereinafter, the write command for which corresponding user data becomes readable is referred to as a target write command. The second completion for the target write command includes the command ID of the target write command. Then, the CPU 12 updates the write management table 63 (step S409). Specifically, the CPU 12 deletes an entry corresponding to the target write command from the write management table 63. In addition, the CPU 12 updates the command log 53 to add the command ID of the target write command (step S410).

Next, the CPU 12 determines whether second completions have been stored in the completion queue 244 for all write commands that correspond to the user data of the write unit written in step S406 (step S411). In a case where a second completion is not stored in the completion queue 244 for at least one of the write commands that correspond to the user data of the write unit (no in step S411), the processing by the CPU 12 returns to step S407.

On the other hand, in a case where the second completions have been stored in the completion queue 244 for all the write commands that correspond to the user data of the write unit (yes in step S411), the processing by the CPU 12 returns to step S401. That is, the CPU 12 continues processing for receiving a new write command from the host 2 and controlling writing of user data corresponding to write commands that have been received.

With the above write control process, the CPU 12 can receive a write command from the host 2 and control writing of user data corresponding to write commands that have been received. Specifically, when receiving a write command from the host 2, the CPU 12 returns a first completion to the host 2. Further, when user data of the write unit is stored in the data buffer 242, the CPU 12 writes the user data of the write unit into the NAND flash memory 5. Then, the CPU 12 returns second completions to the host 2 for write commands that correspond to the user data which have been written.

Therefore, the CPU 12 can notify the host 2 of a processing state of a write command by returning a first completion and a second completion to the host 2. In addition, the CPU 12 can efficiently use the storage area of the NAND flash memory 5 by writing according to the delayed write completion.

Note that, not only in a case where the total amount of user data that is to be written and is stored in the data buffer 242 of the host 2 has reached the write unit in step S404, but also in a case where time elapsed after a write command is received exceeds a threshold value, the CPU 12 may write user data that correspond to write commands into the NAND flash memory 5 with padding. Specifically, in a case where time elapsed from reception of a write command exceeds the threshold value, the CPU 12 transfers user data that corresponds to write commands having been received, from the data buffer 242 of the host 2 to the NAND flash memory 5. Then, the CPU 12 writes the transferred user data with padding into the NAND flash memory 5. Accordingly, the CPU 12 can notify a second completion for the write command within time expected by the host 2.

(Processing in Host 2 Based on Response from Memory System 3)

FIG. 21 is a flowchart illustrating an example of the procedure of a response reception process executed by the CPU 21 of the host 2. The response reception process is a process based on a response (completion) received from the memory system 3. The CPU 21 executes the response reception process in response to reception of an interrupt issued by the memory system 3.

First, the CPU 21 acquires a completion from the completion queue 244 (step S501). The CPU 21 acquires a command ID included in the acquired completion (step S502). Then, the CPU 21 identifies an entry in the locked data list 245 that corresponds to the acquired command ID (step S503).

The CPU 21 determines whether the received completion is a first completion by using the identified entry (step S504). Specifically, for example, in a case where no value is set as a completion state in the identified entry, the CPU 21 determines that the received completion is a first completion. In addition, in a case where a value indicating that a first completion has been received is set as the completion state in the identified entry, the CPU 21 determines that the received completion is a second completion.

In a case where the received completion is a first completion (yes in step S504), the CPU 21 adds one to a variable Cseq (that is, increments the variable Cseq) that is used for assigning a sequence number to a completion (step S505). Then, the CPU 21 updates the identified entry by using the variable Cseq (step S506), and ends the response reception process. Specifically, the CPU 21 adds (sets) the sequence number indicated by the variable Cseq as the completion order in the identified entry. Accordingly, the sequence number indicated by the variable Cseq is assigned to the received completion. In addition, the CPU 21 adds a value indicating that the first completion has been received as the completion state in the identified entry.

In a case where the received completion is a second completion (no in step S504), the CPU 21 unlocks user data in the data buffer 242 that is associated with the acquired command ID (step S507). The application or the OS 221 deletes the user data 71 after the data buffer 242 is unlocked. For example, the CPU 21 is capable of identifying user data in the data buffer 242 to be unlocked by using the data management area information in the identified entry. When the user data is unlocked, the user data is deleted. That is, a storage area in the data buffer 242 (that is, a storage area in the NVRAM 24) in which the user data is stored is released.

Then, the CPU 21 deletes the identified entry from the locked data list 245 (step S508), and ends the response reception process.

With the above response reception process, the CPU 21 can perform different processing depending on whether the received completion is a first completion or a second completion for the corresponding write command. That is, in a case where the received completion is the first completion, the CPU 21 adds the sequence number Cseq assigned to the completion and the information indicating that the first completion has been received to the corresponding entry in the locked data list 245. In addition, in a case where the received completion is the second completion, the CPU 21 deletes the corresponding user data (that is, the user data which has been written) and the corresponding entry in the locked data list 245 from the NVRAM 24.

Next, an unbind process will be described with reference to FIGS. 22 and 23. The unbind process is a process for forcibly transitioning the memory system 3 from the virtual PLP drive mode to the normal drive mode. Here, it is assumed that the memory system 3 is operating in the virtual PLP drive mode for the host 2. In the memory system 3 operating in the virtual PLP drive mode, the NAND flash memory 5 stores the host ID of the host 2 and the first mode information 52 indicative of the virtual PLP drive mode.

(Unbind Process in Host 2)

FIG. 22 is a flowchart illustrating an example of the procedure of the unbind process executed by the CPU 21 of the host 2. The CPU 21 may execute the unbind process in a case where the host 2 or the memory system 3 is started after improper termination or in a case where the memory system 3 is unintentionally restarted.

First, the CPU 21 transmits a first mode release command to the memory system 3 (step S601). The first mode release command is a command for requesting transition from the virtual PLP drive mode to the normal drive mode. Then, the CPU 21 deletes the virtual PLP drive ID 241 from the NVRAM 24 (step S602). The CPU 21 may delete the virtual PLP drive ID 241 from the NVRAM 24 when the CPU 21 receives from the memory system 3 a response indicating that the transition to the normal drive mode has completed.

With the above unbind process, the CPU 21 can make the memory system 3 operating in the virtual PLP drive mode transition to the normal drive mode.

(Unbind Process in Memory System 3)

FIG. 23 is a flowchart illustrating an example of the procedure of the unbind process executed by the CPU 12 of the memory system 3. The CPU 12 executes the unbind process in response to reception of a first mode release command from the host 2.

The CPU 12 makes the memory system 3 transition from the virtual PLP drive mode to the normal drive mode on the basis of the first mode release command received from the host 2 (step S701). More specifically, the CPU 12 updates the first mode information 52 stored in the NAND flash memory 5 so as to indicate the normal drive mode. Then, the CPU 12 deletes the virtual PLP host ID 51 from the NAND flash memory 5 (step S702).

With the above unbind process, the CPU 12 can make the memory system 3 transition from the virtual PLP drive mode to the normal drive mode on the basis of the first mode release command received from the host 2.

Next, a shutdown process in a case where the operation of the memory system 3 is properly terminated will be described with reference to FIGS. 24 and 25.

(Shutdown Process in Host 2)

Figure 24:
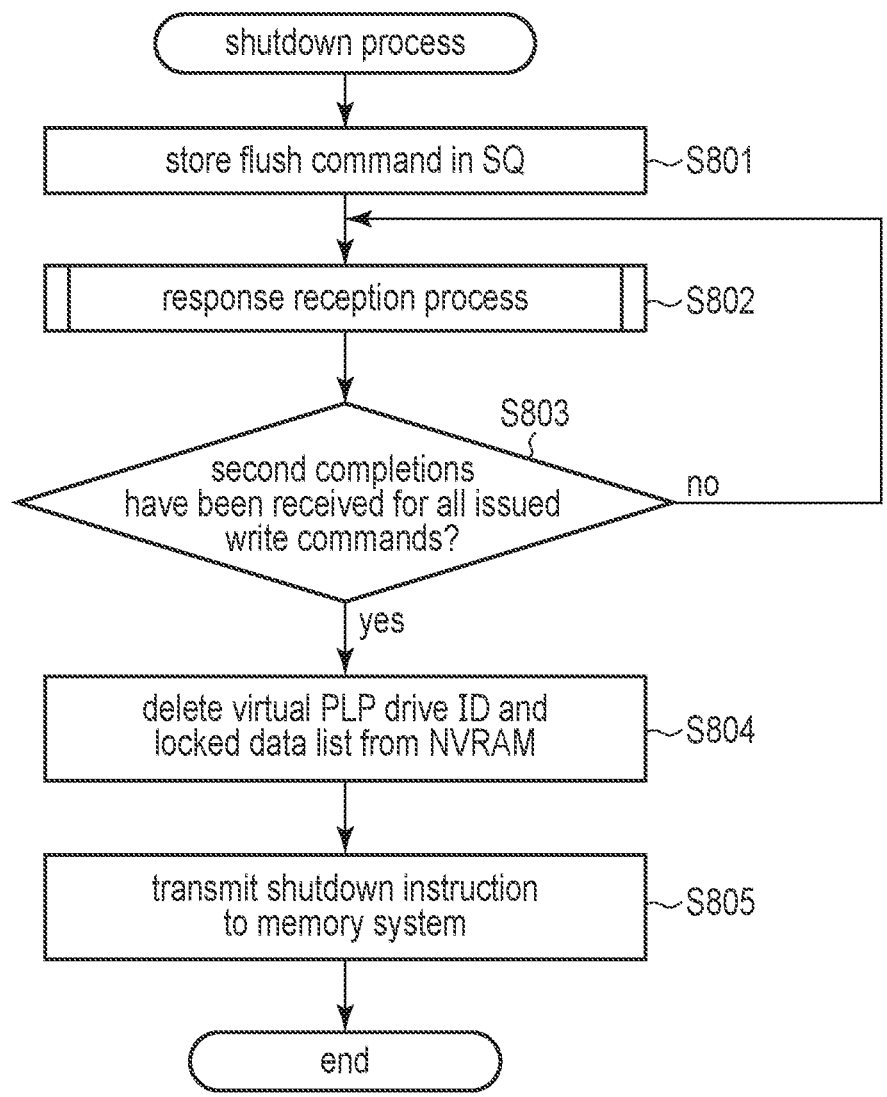
FIG. 24 is a flowchart illustrating an example of the procedure of a shutdown process executed in the information processing apparatus of the embodiment.

FIG. 24 is a flowchart illustrating an example of the procedure of the shutdown process executed by the CPU 21 of the host 2. The CPU 21 executes the shutdown process before requesting the memory system 3 to terminate the operation.

First, the CPU 21 stores a flush command in the submission queue 243 (step S801).

Next, the CPU 21 executes the response reception process (step S802). The specific procedure of the response reception process is as described above with reference to FIG. 21. Then, by using the locked data list 245, the CPU 21 determines whether second completions have been received for all write commands that have been issued (step S803). In a case where no entry is included in the locked data list 245, the CPU 21 determines that second completions have been received for all the issued write commands. In a case where at least one entry is included in the locked data list 245, the CPU 21 determines that a second completion has not been received for at least one write command among the issued write commands.

When a second completion is not received for at least one command among the issued write commands (no in step S803), the process by the CPU 21 returns to step S802. That is, the CPU 21 continues processing for receiving completions for the issued write commands from the memory system 3.

In a case where the second completions have been received for all the issued write commands (yes in step S803), the CPU 21 deletes the virtual PLP drive ID 241 and the locked data list 245 from the NVRAM 24 (step S804). Then, the CPU 21 transmits a shutdown instruction to the memory system 3 (step S805).

With the above shutdown process, the CPU 21 can transmit the shutdown instruction to the memory system 3 after receiving the second completions for all the write commands issued to the memory system 3. That is, the CPU 21 can perform control such that the operation of the memory system 3 is not terminated before writing of user data corresponding to all the write commands is completed (that is, an improper termination does not occur).

(Shutdown Process in Memory System 3)

Figure 25:
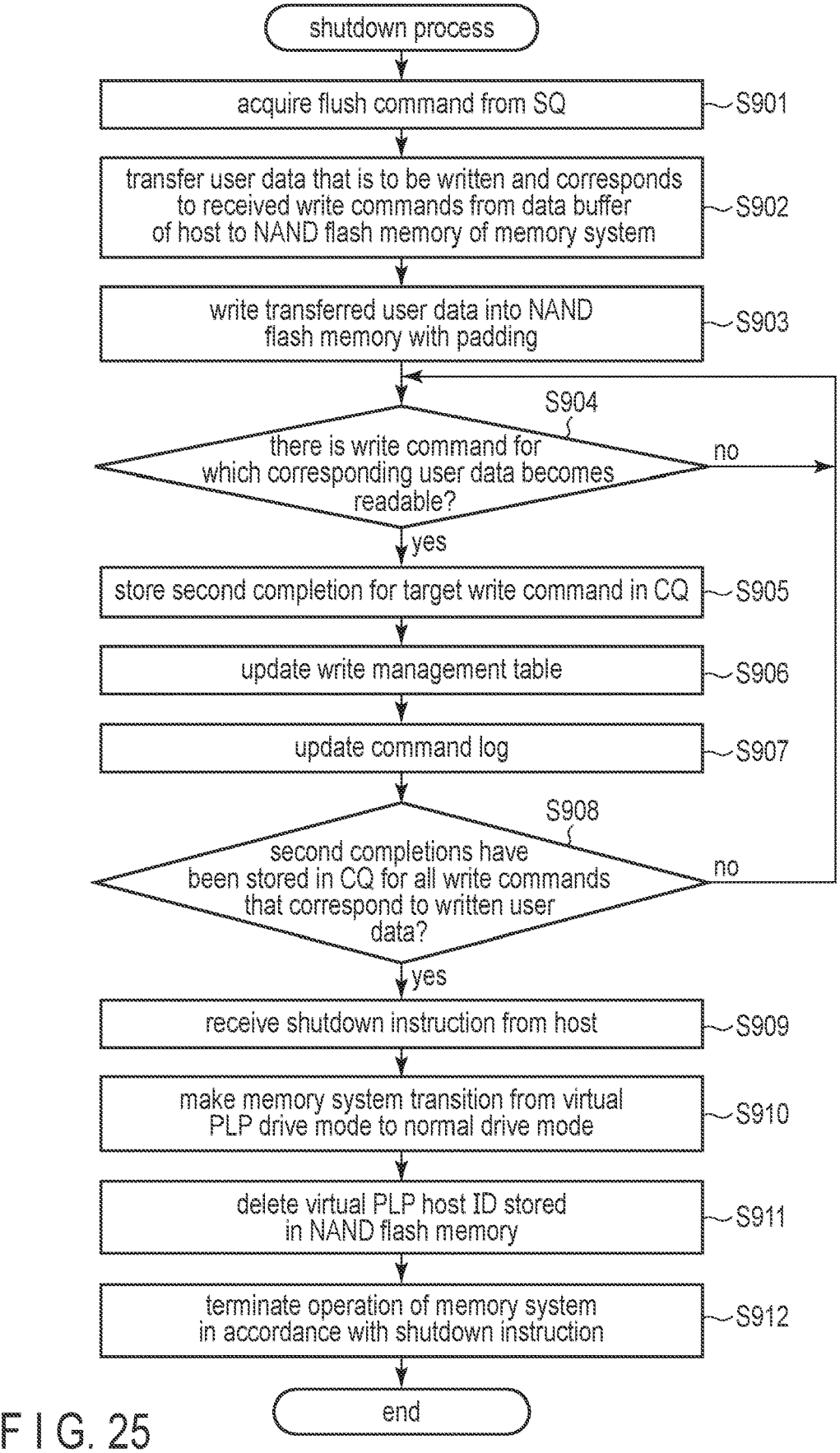
FIG. 25 is a flowchart illustrating an example of the procedure of a shutdown process executed in the memory system of FIG. 1.

FIG. 25 is a flowchart illustrating an example of the procedure of the shutdown process executed by the CPU 12 of the memory system 3. The CPU 12 executes the shutdown process in accordance with a request by the host 2 (more specifically, a flush command, a shutdown instruction, and the like).

First, the CPU 12 acquires a flush command from the submission queue 243 (step S901). In accordance with the acquired flush command, the CPU 12 transfers user data that is to be written and corresponds to write commands having been received, from the data buffer 242 of the host 2 to the NAND flash memory 5 of the memory system 3 (step S902). The CPU 12 writes the transferred user data with padding into the NAND flash memory 5 (step S903).

The procedure of subsequent steps S904 to S908 is similar to the procedure of S407 to S411 of the write control process described above with reference to FIG. 20. That is, the CPU 12 performs processing for storing, in the completion queue 244, second completions for all the write commands that correspond to the written user data.

Then, when the second completions for all the write commands that correspond to the written user data are stored in the completion queue 244 (yes in step S908), the CPU 12 receives a shutdown instruction from the host 2 (step S909). The CPU 12 makes the memory system 3 transition from the virtual PLP drive mode to the normal drive mode on the basis of the shutdown instruction (step S910). More specifically, the CPU 12 updates the first mode information 52 stored in the NAND flash memory 5 so as to indicate the normal drive mode. In addition, the CPU 12 deletes the virtual PLP host ID 51 stored in the NAND flash memory 5 (step S911). Then, the CPU 12 terminates the operation of the memory system 3 (step S912).

With the above shutdown process, the CPU 12 can complete writing of the user data that corresponds to all the write commands issued to the memory system 3, in accordance with the flush command received from the host 2. Then, the CPU 12 can terminate the operation of the memory system 3 after storing the second completions for all the write commands in the completion queue 244. That is, the CPU 12 can control the memory system 3 so that the operation of the memory system 3 is not terminated before the writing of the user data corresponding to all the write commands is completed (that is, an improper termination does not occur).

Incidentally, as described above, in a case where time elapsed from reception of a write command exceeds the threshold value, the CPU 12 may write user data corresponding to the received write command into the NAND flash memory 5 with padding. In this case, the CPU 12 notifies a second completion for the write command within the time expected by the host 2, and thus the CPU 21 of the host 2 does not need to perform the procedure of storing a flush command in the submission queue 243 in the shutdown process (corresponding to step S801 in FIG. 24).

Next, a start process will be described with reference to FIGS. 26 to 28. The start process is a process for determining the presence or absence of writing of user data that has failed to be completed because of an improper termination of the memory system 3 immediately before the current start or an unintentional restart, and recovering the writing of the user data that has failed to be completed.

(Start Process in Host 2)

Figure 26:
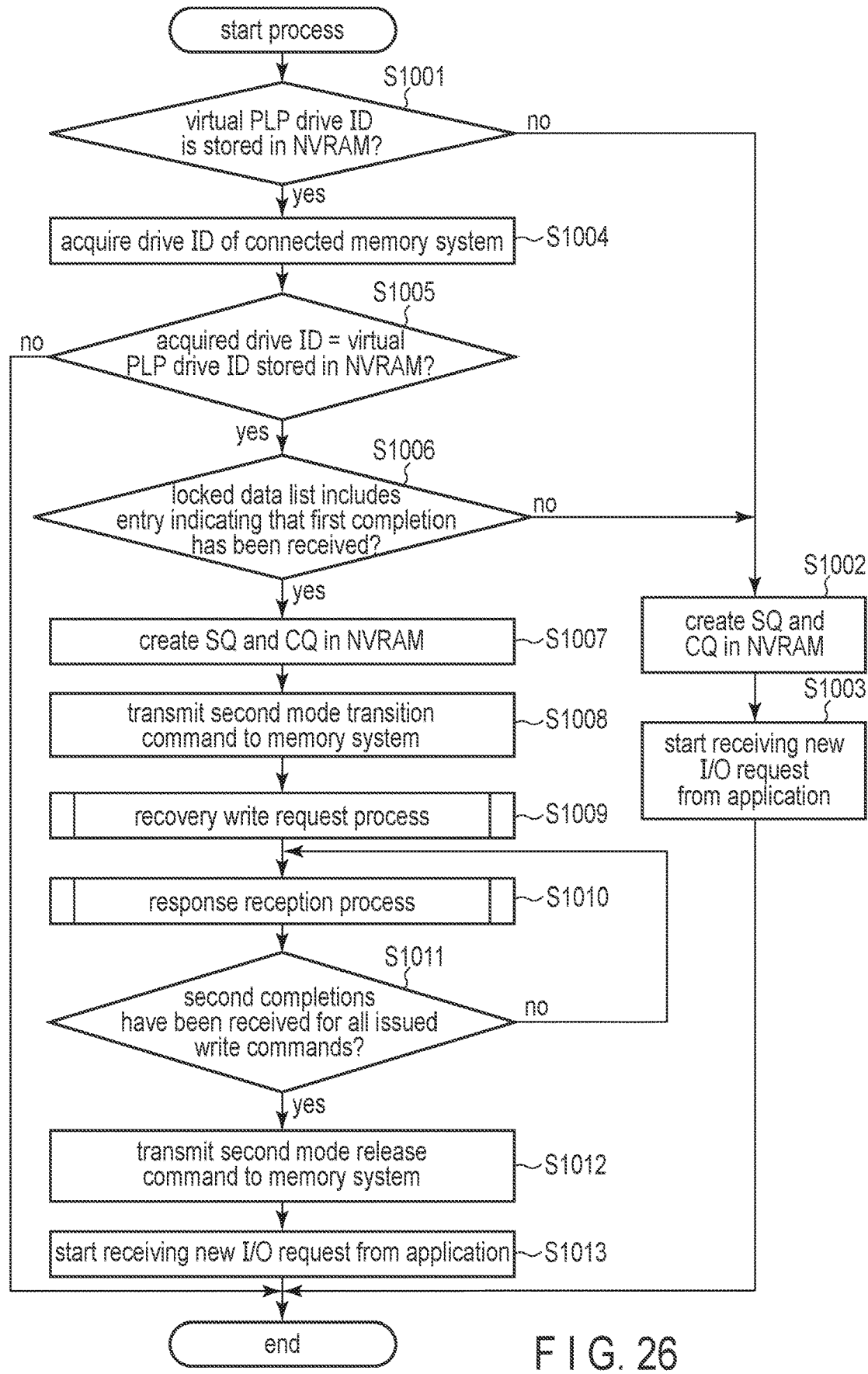
FIG. 26 is a flowchart illustrating an example of the procedure of a start process executed in the information processing apparatus of the embodiment.

FIG. 26 is a flowchart illustrating an example of the procedure of the start process executed by the CPU 21 of the host 2. The CPU 21 executes the start process when the memory system 3 is started and connected to the host 2.

The CPU 21 determines whether the virtual PLP drive ID 241 is stored in the NVRAM 24 (step S1001). For example, in a case where the memory system 3 was improperly terminated immediately before the current start and in a case where the memory system 3 is unintentionally restarted, there is a possibility that the virtual PLP drive ID 241 is stored in the NVRAM 24.

When the virtual PLP drive ID 241 is not stored in the NVRAM 24 (no in step S1001), the CPU 21 creates a submission queue 243 and a completion queue 244 in the NVRAM 24 (step S1002). That is, the CPU 21 allocates storage areas in the NVRAM 24 as the submission queue 243 and the completion queue 244, respectively. Then, the CPU 21 starts receiving a new I/O request from the application (step S1003), and ends the start process.

When the virtual PLP drive ID 241 is stored in the NVRAM 24 (yes in step S1001), the CPU 21 acquires the drive ID of the memory system 3 connected to the host 2 (step S1004). The CPU 21 determines whether the acquired drive ID matches the virtual PLP drive ID 241 stored in the NVRAM 24 (step S1005).

When the acquired drive ID is different from the virtual PLP drive ID 241 stored in the NVRAM 24 (no in step S1005), the CPU 21 ends the start process. That is, since the connected memory system 3 is different from a memory system operating in the virtual PLP drive mode for the host 2, the CPU 21 ends the start process. Note that the bind process described above with reference to FIGS. 17 and 18 may be performed in the host 2 and the memory system 3. In this case, the memory system 3 may be newly operated in the virtual PLP drive mode for the host 2.

When the acquired drive ID matches the virtual PLP drive ID 241 stored in the NVRAM 24 (yes in step S1005), the CPU 21 determines whether the locked data list 245 that is associated with the acquired drive ID includes an entry indicating that a first completion has been received (step S1006).

When the locked data list 245 does not include an entry indicating that a first completion has been received (no in step S1006), the CPU 21 creates a submission queue 243 and a completion queue 244 in the NVRAM 24 (step S1002). Then, the CPU the 21 starts receiving a new I/O request from the application (step S1003), and ends the start process.

When the locked data list 245 includes an entry indicating that a first completion has been received (yes in step S1006), the CPU 21 creates a submission queue 243 and a completion queue 244 in the NVRAM 24 (step S1007). The CPU 21 transmits a second mode transition command to the memory system 3 (step S1008). The second mode transition command is a command for making the memory system 3 transition from the normal write mode to the recovery write mode. Then, the CPU 21 executes a recovery write request process (step S1009). The recovery write request process is a process for requesting the memory system 3 to write user data corresponding to each of one or more entries in the locked data list 245 which indicates that a first completion has been received. More specifically, in the recovery write request process, a write command corresponding to each of the one or more entries in the locked data list 245 which indicates that the first completion has been received is stored in the submission queue 243. A specific procedure of the recovery write request process will be described later with reference to FIG. 27.

Next, the CPU 21 executes the response reception process (step S1010). In the response reception process, processing in accordance with a first completion or a second completion for a write command that is received from the memory system 3 is performed. The specific procedure of the response reception process is as described above with reference to FIG. 21.

Then, the CPU 21 determines whether second completions have been received for all write commands that have been issued (step S1011). All the issued write commands are all write commands issued in the recovery write request process in step S1009.

When a second completion is not received for at least one write command among all the issued write commands (no in step S1011), the process by the CPU 21 returns to step S1010. That is, the CPU 21 continues processing for receiving a completion for the issued write command from the memory system 3.

When second completions have been received for all the issued write commands (yes in step S1011), the CPU 21 transmits a second mode release command to the memory system 3 (step S1012). The second mode release command is a command for making the memory system transition from the recovery write mode to the normal write mode. Then, the CPU 21 starts receiving a new I/O request from the application (step S1013), and ends the start process.

With the above start process, the CPU 21 can request the memory system 3 again to write user data that has not been written into the NAND flash memory 5 of the memory system 3 because of an improper termination of the memory system 3 immediately before the current start or an unintentional restart of the memory system 3. More specifically, the CPU 21 issues a write command based on an entry in the locked data list 245 which indicates that a first completion has been received, and stores the write command in the submission queue 243. Accordingly, the CPU 21 can request the memory system 3 to write the user data.

Note that, in step S1011, instead of determining whether second completions have been received for all the issued write commands, the CPU 21 may determine whether first completions have been received for all the issued write commands. When having received first completions for all the issued write commands, the CPU 21 can determine that writing of user data that failed to complete because of an improper termination of the memory system 3 immediately before the current start or an unintentional restart has been recovered. In this case, in response to the reception of the first completions for all the issued write commands, the CPU 21 transmits the second mode release command to the memory system 3 and starts receiving a new I/O request from the application.

Figure 27:
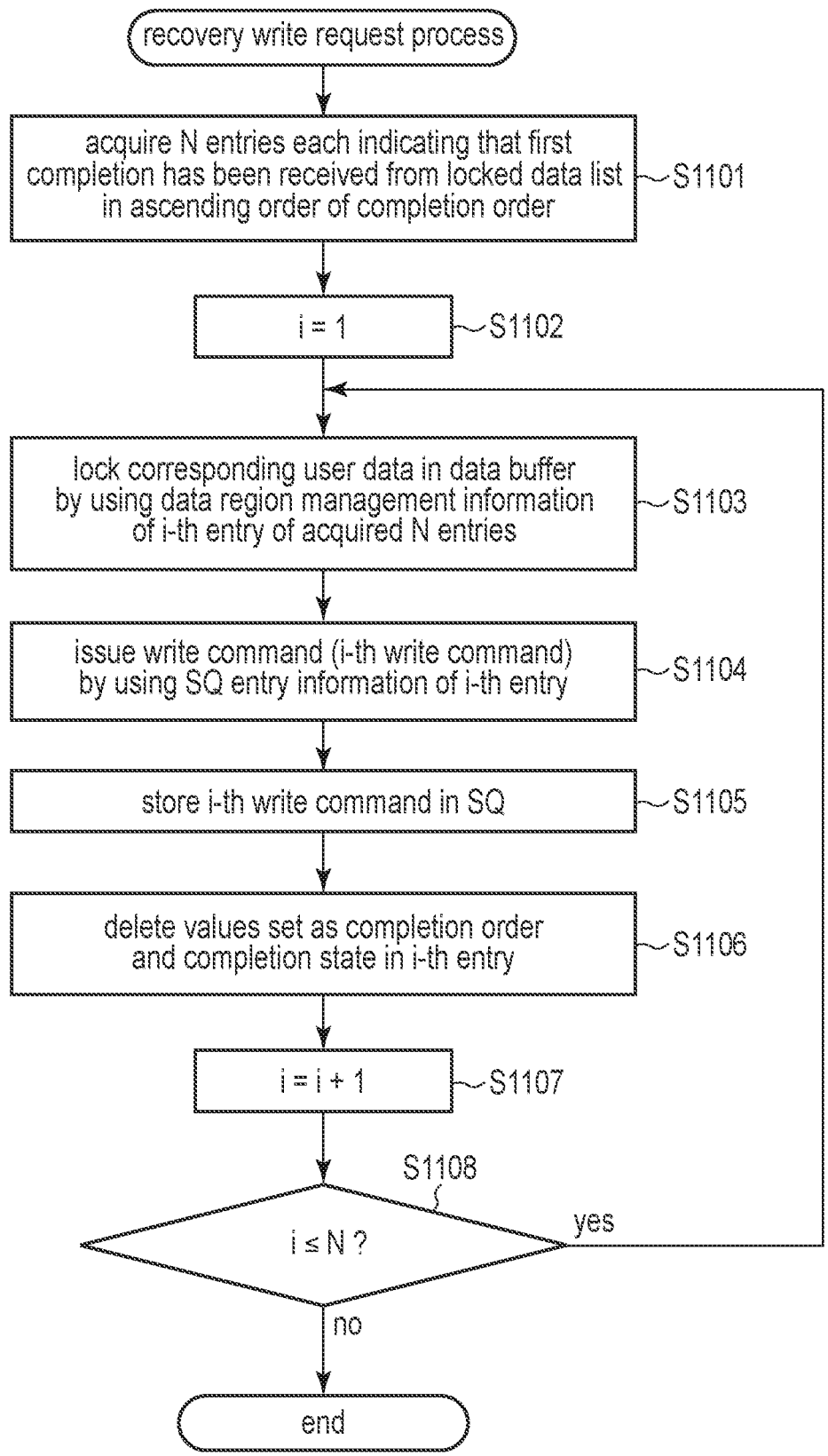
FIG. 27 is a flowchart illustrating an example of the procedure of a recovery write request process executed in the information processing apparatus of the embodiment.

FIG. 27 is a flowchart illustrating an example of the procedure of the recovery write request process executed by the CPU 21 of the host 2. The recovery write request process corresponds to step S1009 of the start process described above with reference to FIG. 26.

First, the CPU 21 acquires N entries each indicating that a first completion has been received, from the locked data list 245 in ascending order of the completion order (step S1101). Note that N is an integer of one or more. Then, the CPU 21 sets one to a variable i (step S1102). The variable i is used for identifying one of the N entries that are arranged in ascending order of the completion order. Hereinafter, an i-th entry of the N entries arranged in ascending order of the completion order is referred to as an i-th entry.

The CPU 21 locks corresponding user data in the data buffer 242 by using the data region management information of the i-th entry (step S1103). More specifically, by using the data region management information of the i-th entry, the CPU 21 identifies a storage area in the data buffer 242 in which the user data is stored. Then, the CPU 21 locks the identified storage area by using a function of the OS 221 being executed.

Next, the CPU 21 issues a write command based on the SQ entry information of the i-th entry (hereinafter, referred to as an i-th write command) (step S1104). The CPU 21 stores the i-th write command in the submission queue 243 (step S1105). The CPU 21 deletes values set as the completion order and the completion state in the i-th entry (step S1106). That is, after issuing the corresponding write command, the CPU 21 updates the i-th entry so as to indicate that a first completion is not yet received. Then, the CPU 21 adds one to the variable i (step S1107).

Next, the CPU 21 determines whether the variable i is N or less (step S1108). When the variable i is N or less (yes in step S1108), the process by the CPU 21 returns to step S1103. That is, the CPU 21 further performs processing for transmitting a write command based on another entry indicating that a first completion has been received to the memory system 3.

In a case where the variable i exceeds N (no in step S1108), the CPU 21 ends the recovery write request process.

With the above recovery write request process, the CPU 21 can request the memory system 3 to perform writing of the user data that has failed to complete because of an improper termination of the memory system 3 immediately before the current start or an unintentional restart. Specifically, the CPU 21 can transmit the write command corresponding to each of the N entries which indicates that a first completion has been received to the memory system 3 via the submission queue 243 by using the locked data list 245.

(Start Process in Memory System 3)

Figure 28:
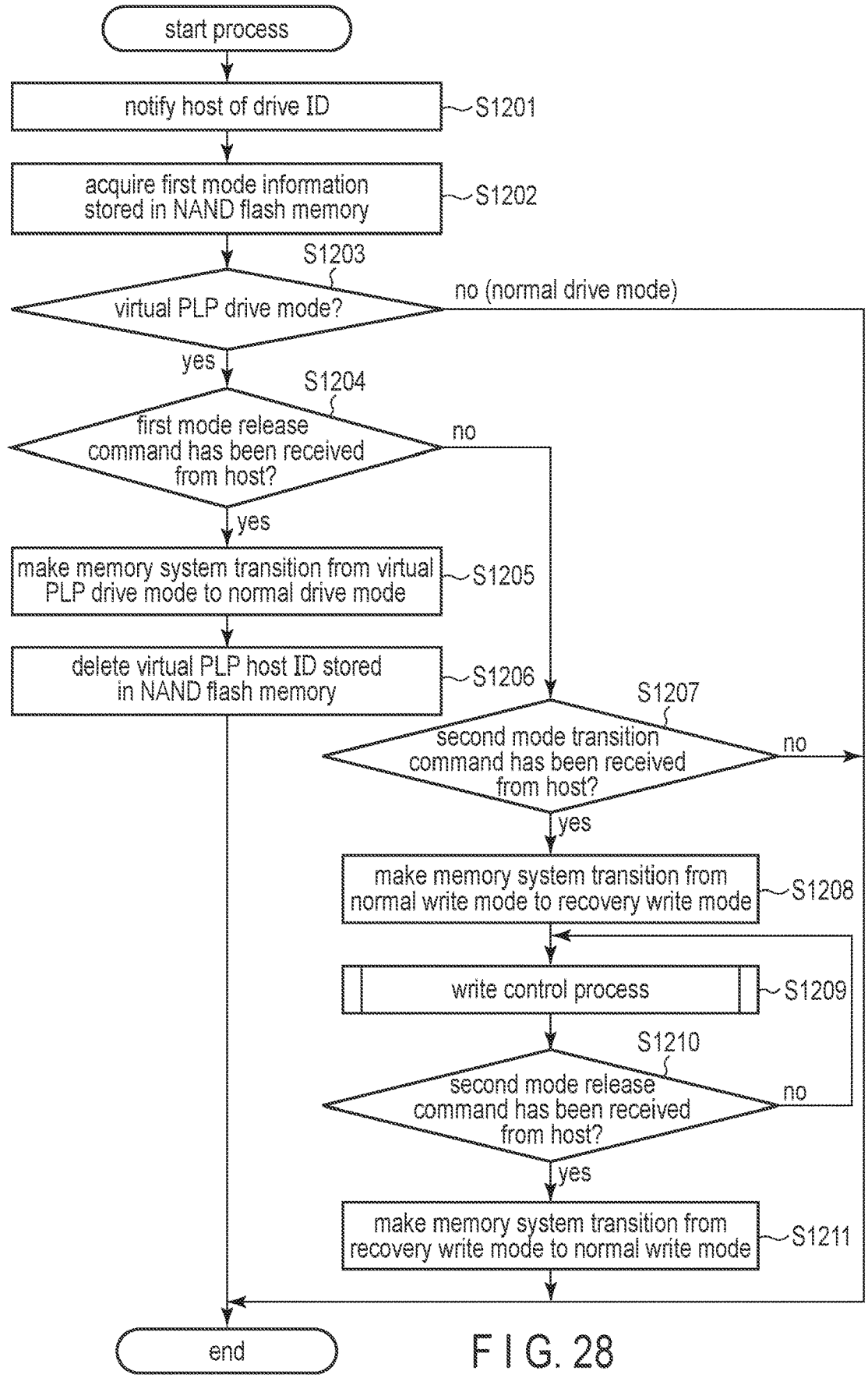
FIG. 28 is a flowchart illustrating an example of the procedure of a start process executed in the memory system of FIG. 1.

FIG. 28 is a flowchart illustrating an example of the procedure of the start process executed by the CPU 12 of the memory system 3. When the memory system 3 is started and a connection to the host 2 is established, the CPU 12 executes the start process.

First, the CPU 12 notifies the host 2 of the drive ID (step S1201). The drive ID may be notified to the host 2 in processing for establishing the connection between the memory system 3 and the host 2.

Next, the CPU 12 acquires the first mode information 52 stored in the NAND flash memory 5 (step S1202). The first mode information 52 indicates whether the memory system 3 is in the normal drive mode or the virtual PLP drive mode. The CPU 12 determines whether the acquired first mode information 52 indicates the virtual PLP drive mode (step S1203).

When the acquired first mode information 52 does not indicate the virtual PLP drive mode (no in step S1203), that is, indicates the normal drive mode, the CPU 12 ends the start process. When the first mode information 52 indicates the normal drive mode, the CPU 12 determines that there is no writing of user data that failed to complete because of an improper termination of the memory system 3 immediately before the current start or an unintentional restart. Therefore, the CPU 12 ends the start process and permits access to the memory system 3 by the host 2.

When the acquired first mode information 52 indicates the virtual PLP drive mode (yes in step S1203), the CPU 12 determines whether a first mode release command has been received from the host 2 (step S1204). The first mode release command is a command for making the memory system 3 transition from the virtual PLP drive mode to the normal drive mode.

When a first mode release command has been received from the host 2 (yes in step S1204), the CPU 12 makes the memory system 3 transition from the virtual PLP drive mode to the normal drive mode (step S1205). Then, the CPU 12 deletes the virtual PLP host ID 51 stored in the NAND flash memory 5 (step S1206), and ends the start process. Accordingly, in the memory system 3 that has transitioned to the normal drive mode, the CPU 12 permits access to the memory system 3 by the host 2.

When a first mode release command is not received from the host 2 (no in step S1204), the CPU 12 determines whether a second mode transition command has been received from the host 2 (step S1207). The second mode transition command is a command for making the memory system 3 transition from the normal write mode to the recovery write mode. When the memory system 3 transitions to the recovery write mode, the CPU 12 processes write commands received from the host 2 (that is, write commands acquired from the submission queue 243) in the same order of reception. That is, the CPU 12 ensures that write processing in accordance with the write commands is executed in the same order of reception.

When a second mode transition command is not received from the host 2 (no in step S1207), the CPU 12 ends the start process. For example, in a case where there is no user data that has not been written into the NAND flash memory 5 although the memory system 3 is improperly terminated immediately before the current start or is unintentionally restarted, the CPU 12 ends the start process. Therefore, in the memory system 3 operating in the virtual PLP drive mode, the CPU 12 permits access to the memory system 3 by the host 2.

When a second mode transition command is received from the host 2 (yes in step S1207), the CPU 12 makes the memory system 3 transition from the normal write mode to the recovery write mode (step S1208). Then, the CPU 12 executes the write control process (step S1209). In the write control process, the CPU 12 receives a write command from the host 2 and controls writing of user data corresponding to write commands that have been received. The specific procedure of the write control process is as described above with reference to FIG. 20.

Next, the CPU 12 determines whether a second mode release command has been received from the host 2 (step S1210).

When a second mode release command is not received from the host 2 (no in step S1210), the process by the CPU 12 returns to step 1209. That is, the CPU 21 continues the write control process until a second mode release command is received from the host 2.

When a second mode release command has been received from the host 2 (yes in step S1210), the CPU 12 makes the memory system 3 transition from the recovery write mode to the normal write mode (step S1211), and ends the start process. Accordingly, in the memory system 3 that has transitioned to the normal write mode, the CPU 12 permits access to the memory system 3 by the host 2.

With the above start process, in a case where there is writing of user data that failed to complete because of an improper termination of the memory system 3 immediately before the current start or an unintentional restart, the CPU 12 can recover the writing of the user data that failed to complete.

Here, a recovery write request process and a write control process in a case where the memory system 3 does not include a configuration for operating in the recovery write mode will be described. In this case, when the memory system 3 receives multiple write commands from the host 2, there is a possibility that execution of write processing in accordance with the write commands in the order of reception cannot be ensured.

Therefore, in transmitting to the memory system 3 multiple write commands that designate LBAs (or LBA ranges) overlapping each other, the host 2 stores a flush command in the submission queue 243 immediately after storing one of the write commands in the submission queue 243, for example. Specifically, the host 2 repeats an operation of waiting for a completion for the flush command to be received and storing the next write command in the submission queue 243. The memory system 3 performs a process of writing data of the write command received before receiving the flush command into the NAND flash memory 5 in the order of returning the completion of the flush command. Accordingly, in the memory system 3, it is possible to ensure that write processing corresponding to each of the multiple write commands that designate the same LBA is executed in the order of reception of the write commands.

The memory system 3 according to the embodiment supports the recovery write mode, and thus the host 2 can perform the recovery process at high speed by simply stacking write commands in the submission queue 243 in the order desired to be processed.

Figure 29:
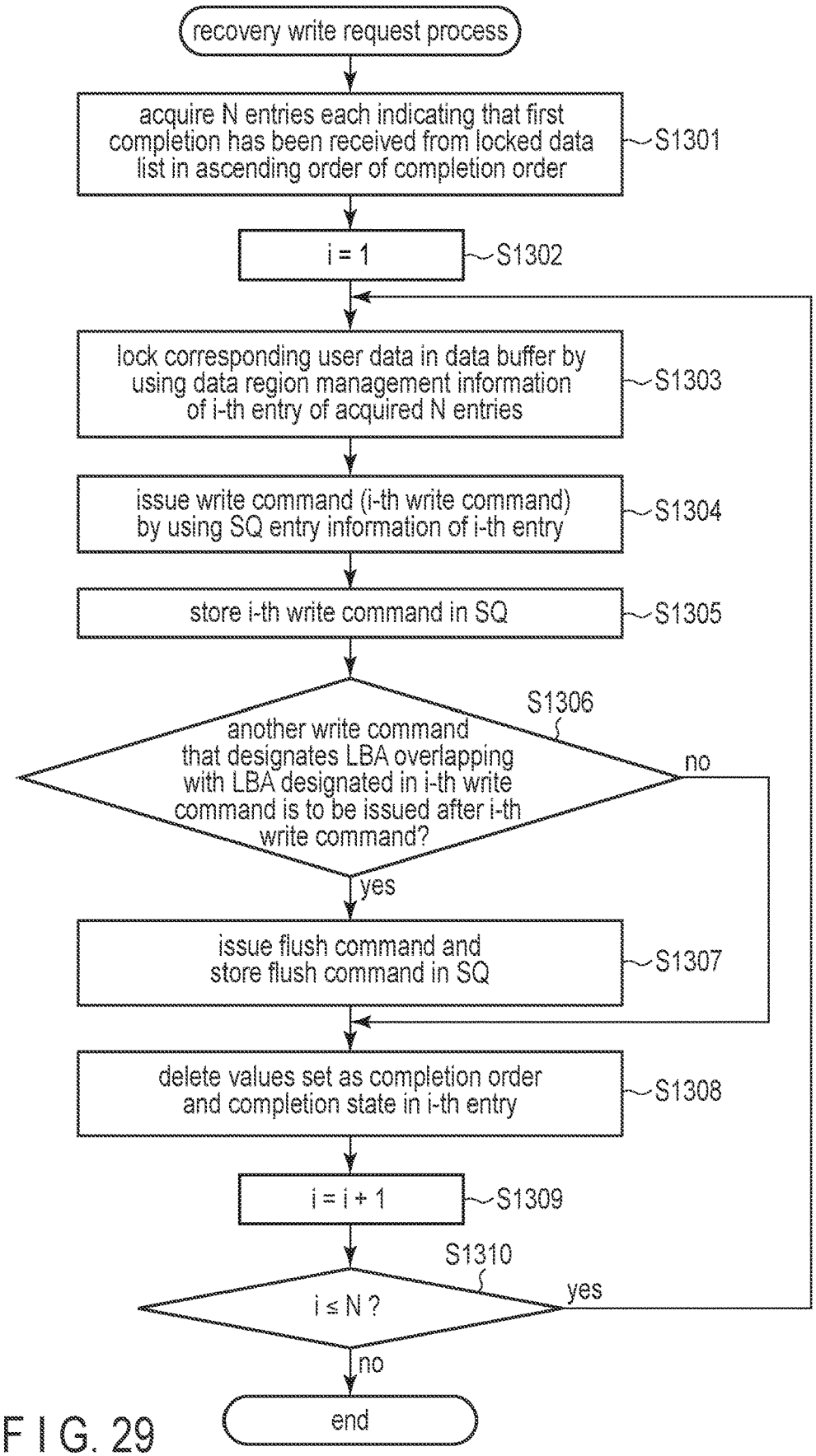
FIG. 29 is a flowchart illustrating an example of the procedure of a recovery write request process in a case where a flush command is used, the processing being executed in the information processing apparatus of the embodiment.

FIG. 29 is a flowchart illustrating an example of the procedure of the recovery write request process in a case where a flush command is used. The recovery write request process is executed by the CPU 21 of the host 2. The procedure from step S1301 to step S1305 is similar to the procedure from step S1101 to step S1105 of the recovery write request process described above with reference to FIG. 27. That is, the CPU 21 acquires N entries each indicating that a first completion has been received, from the locked data list 245 in ascending order of the completion order. The CPU 21 locks corresponding user data in the data buffer 242 on the basis of an i-th entry, issues a corresponding write command (i-th write command), and stores the write command in the submission queue 243.

Next, the CPU 21 determines whether another write command designating an LBA (or an LBA range) that overlaps with that of the i-th write command is to be issued after the i-th write command, by referring to the N entries (step S1306). Specifically, for example, the CPU 21 determines whether the N entries include an entry that includes a completion order larger than the completion order of the i-th entry and includes SQ entry information corresponding to a write command which designates the same LBA as the i-th write command.

When another write command designating an LBA that overlaps with that of the i-th write command is to be issued after the i-th write command (yes in step S1306), the CPU 21 issues a flush command and stores the flush command in the submission queue 243 (step S1307), and the process by the CPU 21 proceeds to step S1308. In the submission queue 243, the flush command is stored after the i-th write command. Accordingly, in the memory system 3, write processing of user data corresponding to the i-th write command is completed in accordance with the subsequent flush command. Therefore, in the memory system 3, it is possible to ensure that write processing corresponding to each of write commands that designate the same LBA is executed in the order of reception of the write commands.

When another write command designating an LBA that overlaps with that of the i-th write command is not to be issued after the i-th write command (no in step S1306), the process by the CPU 21 proceeds to step S1308.

The procedure from subsequent step S1308 to step S1310 is similar to the procedure of step S1106 and step S1108 of the recovery write request process described above with reference to FIG. 27.

With the above recovery write request process, in the case of transmitting multiple write commands to the memory system 3 that designate LBAs (or LBA ranges) overlapping each other, the CPU 21 stores a flush command in the submission queue 243 immediately after storing one of the write commands in the submission queue 243. Accordingly, in the memory system 3, it is possible to ensure that write processing corresponding to each of the write commands that designate the same LBA is executed in the order of reception of the write commands.

Figure 30:
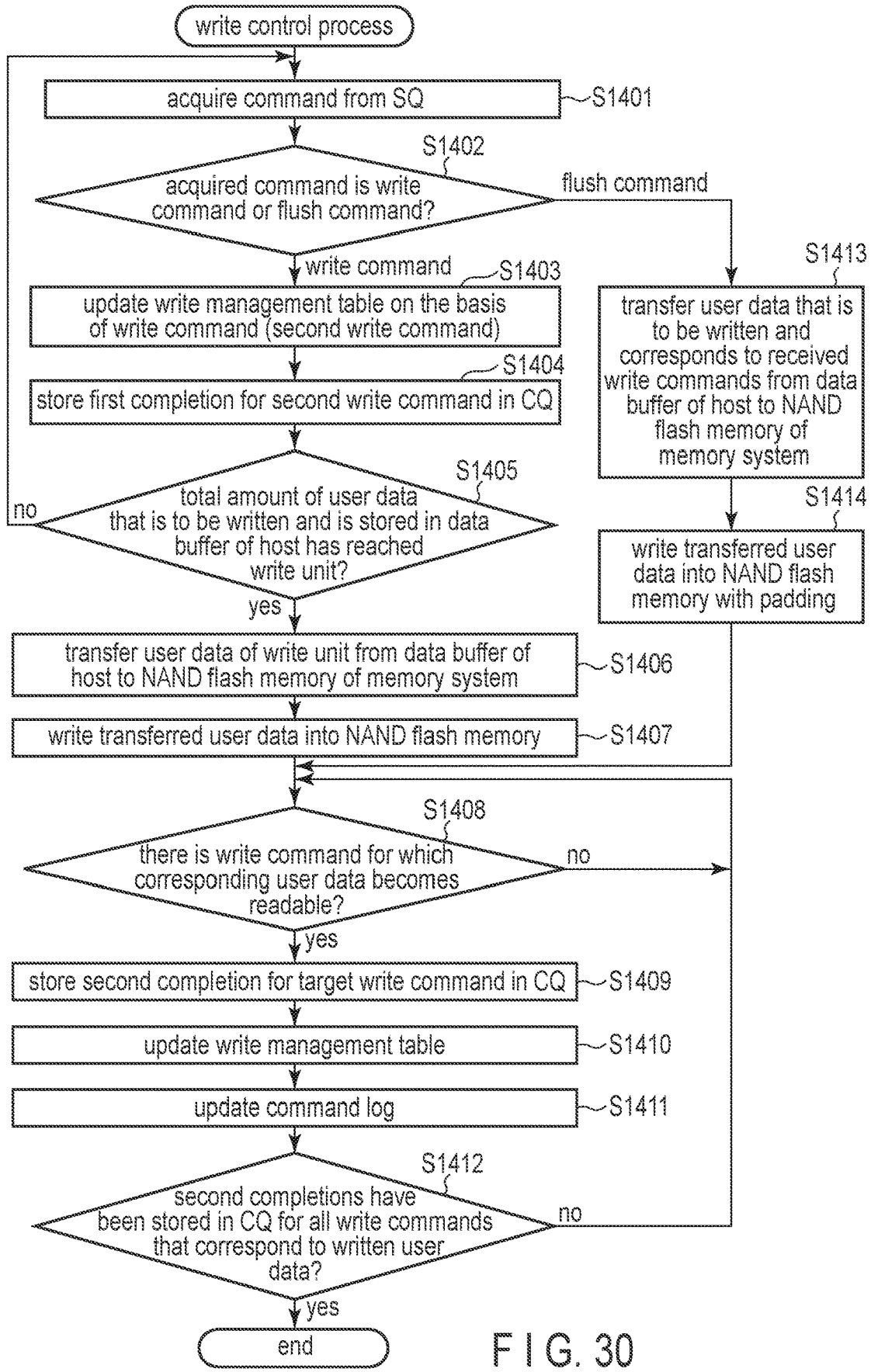
FIG. 30 is a flowchart illustrating an example of the procedure of a write control process in a case where a flush command is used, the processing being executed in the memory system of FIG. 1.

FIG. 30 is a flowchart illustrating an example of the procedure of the write control process in a case where a flush command is used. The write control process is executed by the CPU 12 of the memory system 3. Here, for easy understanding, a case where commands that are stored in the submission queue 243 are only write commands and flush commands will be explained.

First, the CPU 12 acquires a command from the submission queue 243 (step S1401). Then, the CPU 12 determines whether the acquired command is a write command or a flush command (step S1402).

In a case where the acquired command is a write command (write command in step S1402), the CPU 12 executes the procedure of step S1403 to step S1412 and ends the write control process. The procedure of step S1403 to step S1412 is similar to the procedure of step S402 to step S411 of the write control process described above with reference to FIG. 20.

In a case where the acquired command is a flush command (flush command in step S1402), the CPU 12 transfers user data that is to be written and corresponds to received write commands from the data buffer 242 of the host 2 to the NAND flash memory 5 of the memory system 3 (step S1413). The CPU 12 writes the transferred user data into the NAND flash memory 5 with padding (step S1414). Then, the CPU 12 executes the procedure of steps S1408 to S1412, and ends the write control process. The procedure of step S1408 to step S1412 is similar to the procedure of step S407 to step S411 of the write control process described above with reference to FIG. 20.

With the above write control process, in a case where the CPU 12 receives a write command from the host 2 and performs write processing corresponding to the received write command, if a flush command is received, the CPU 12 writes user data that is to be written and is stored in the data buffer 242 of the host 2 to the NAND flash memory 5 with padding. In the case of transmitting multiple write commands that designate an overlapped LBA to the memory system, the host 2 stores a flush command in the submission queue 243 immediately after storing one of the write commands in the submission queue 243. Accordingly, the CPU 12 can complete write processing corresponding to each of the write commands designating the same LBA in response to the subsequent flush command. Therefore, in the memory system 3, it is possible to ensure that the write processing corresponding to each of the write commands designating the same LBA is executed in the order of reception of the write commands.

As described above, according to the embodiment, it is possible to recover incomplete writing to the memory system 3 which was improperly terminated or unintentionally restarted. The write management module 212 stores first data in the NVRAM 24. The write management module 212 and the command issuing module 211 perform a first transmission of a first write request (for example, a write command) associated with the first data to the memory system 3. The write management module 212 stores first management data (for example, an entry of the locked data list 245) including information equivalent to the first write request in the NVRAM 24. In response to receiving, from the memory system 3, a first response to the first write request transmitted in the first transmission, the write management module 212 adds, to the first management data, information indicating that the first response to the first write request transmitted in the first transmission has been received. After receiving the first response, in response to receiving, from the memory system 3, a second response to the first write request transmitted in the first transmission, the write management module 212 deletes the first data and the first management data from the NVRAM 24.

In this manner, the host 2 stores, in the NVRAM 24, the first data to be written into the NAND flash memory 5 and the first management data for managing a processing status of the write command transmitted in the first transmission from the host 2 to the memory system 3. Accordingly, for example, in a case where the memory system 3 does not have a buffer in which the first data can be protected by the PLP function, even when improper termination or unintended restart occurs, the incomplete writing can be recovered by using the first data and the first management data stored in the NVRAM 24.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus that is connectable to a memory system, the information processing apparatus comprising:
a nonvolatile memory; and
a processor configured to:
store first data in the nonvolatile memory;
perform a first transmission of a first write request to the memory system, the first write request being associated with the first data;
store first management data in the nonvolatile memory, the first management data including information equivalent to the first write request,
in response to receiving, from the memory system, a first response to the first write request transmitted in the first transmission, add, to the first management data, information indicating that the first response to the first write request transmitted in the first transmission has been received; and
delete the first data and the first management data from the nonvolatile memory in response to receiving, from the memory system, a second response to the first write request transmitted in the first transmission after receiving the first response.

2. The information processing apparatus according to claim 1, wherein
the processor is further configured to perform, in response to start of the memory system after performing the first transmission of the first write request to the memory system, a second transmission of the first write request to the memory system when the first management data is stored in the nonvolatile memory.

3. The information processing apparatus according to claim 2, wherein
the processor is further configured to delete the first data and the first management data from the nonvolatile memory in response to receiving, from the memory system, a first response and a second response to the first write request transmitted in the second transmission.

4. The information processing apparatus according to claim 1, wherein the processor is further configured to transmit a first mode transition request to the memory system, and the processor is further configured to, in a case where the memory system transitions from a first system mode to a second system mode in accordance with the first mode transition request:
   store identification information of the memory system in the nonvolatile memory;
   perform the first transmission of the first write request to the memory system;
   store the first management data in the nonvolatile memory, the first management data being associated with the identification information;
   in response to receiving, from the memory system, the first response to the first write request transmitted in the first transmission, add information indicating that the first response has been received to the first management data; and
   in response to receiving, from the memory system, the second response to the first write request transmitted in the first transmission after receiving the first response, delete the first data and the first management data that is associated with the identification information from the nonvolatile memory.

5. The information processing apparatus according to claim 4, wherein
   the processor is further configured to perform, in response to start of the memory system, a second transmission of the first write request to the memory system when the identification information of the memory system and the first management data that is associated with the identification information are stored in the nonvolatile memory.

6. The information processing apparatus according to claim 4, wherein
   the processor is further configured to:
   transmit a first mode release command to the memory system operating in the second system mode; and
   delete the identification information of the memory system stored in the nonvolatile memory in response to that the memory system has transitioned from the second system mode to the first system mode in accordance with the first mode release command.

7. The information processing apparatus according to claim 1, wherein
   the processor is further configured to:
   store second data in the nonvolatile memory;
   perform a first transmission of a second write request to the memory system, the second write request being associated with the second data;
   store second management data in the nonvolatile memory, the second management data including information equivalent to the second write request;
   in response to receiving, from the memory system, a third response to the second write request transmitted in the first transmission, add, to the second management data, information indicating that the third response to the second write request transmitted in the first transmission has been received; and
   delete the second data and the second management data from the nonvolatile memory in response to receiving, from the memory system, a fourth response to the second write request transmitted in the first transmission after receiving the third response.

8. The information processing apparatus according to claim 7, wherein the processor is further configured to store, in the nonvolatile memory, information indicating an order of receiving the first response to the first write request transmitted in the first transmission and the third response to the second write request transmitted in the first transmission.

9. The information processing apparatus according to claim 8, wherein
   the processor is further configured to perform, in response to start of the memory system, a second transmission of the first write request to the memory system and a second transmission of the second write request to the memory system according to the order of receiving the first response and the third response when the first management data and the second management data are stored in the nonvolatile memory.

10. The information processing apparatus according to claim 9, wherein
    the processor is further configured to, in response to the start of the memory system, when the first management data and the second management data are stored in the nonvolatile memory:
    transmit a second mode transition request to the memory system; and
    in a case where the memory system has transitioned from a first write mode to a second write mode in accordance with the second mode transition request, perform the second transmission of the first write request to the memory system and the second transmission of the second write request to the memory system according to the order of receiving the first response and the third response, and
    the first write request transmitted in the second transmission and the second write request transmitted in the second transmission are processed in the same order of reception thereof by the memory system that has transitioned to the second write mode.

11. The information processing apparatus according to claim 10, wherein
    the processor is further configured to transmit a second mode release request to the memory system in a case of receiving, from the memory system, (A) the first response and the second response to the first write request transmitted in the second transmission and (B) the third response and the fourth response to the second write request transmitted in the second transmission, the second mode release request making the memory system operating in the second write mode transition to the first write mode.

12. The information processing apparatus according to claim 9, wherein
    the processor is further configured to, in a case where the first write request and the second write request designate the same logical address, transmit a flush request to the memory system after performing either the second transmission of the first write request to the memory system or the second transmission of the second write request to the memory system, the flush request making the memory system complete writing of data corresponding to one or more write requests that have been received by the memory system.

13. The information processing apparatus according to claim 1, wherein
    the processor is further configured to, when the first data and the first management data are stored in the nonvolatile memory before terminating an operation of the memory system:

transmit, to the memory system, a flush request that makes the memory system complete writing of data corresponding to one or more write requests that have been received by the memory system; and transmit, to the memory system, a request terminating the operation of the memory system after receiving, from the memory system, the first response and the second response to the first write request transmitted in the first transmission.

14. The information processing apparatus according to claim 1, wherein the processor is further configured to:
lock the first data so that a storage area in the nonvolatile memory in which the first data is stored is not released, and then perform the first transmission of the first write request to the memory system; and
unlock the first data in response to receiving, from the memory system, the second response to the first write request transmitted in the first transmission.

15. A method of controlling a memory system, comprising:

storing first data in a nonvolatile memory;

performing a first transmission of a first write request to the memory system, the first write request being associated with the first data;

storing first management data in the nonvolatile memory, the first management data including information equivalent to the first write request;

in response to receiving, from the memory system, a first response to the first write request transmitted in the first transmission, adding, to the first management data, information indicating that the first response to the first write request transmitted in the first transmission has been received; and deleting the first data and the first management data from the nonvolatile memory in response to receiving, from the memory system, a second response to the first write request transmitted in the first transmission after receiving the first response.

16. The method according to claim 15, further comprising:

performing, in response to start of the memory system after performing the first transmission of the first write request to the memory system, a second transmission of the first write request to the memory system when the first management data is stored in the nonvolatile memory.

17. The method according to claim 16, further comprising:

deleting the first data and the first management data from the nonvolatile memory in response to receiving, from the memory system, a first response and a second response to the first write request transmitted in the second transmission.

18. The method according to claim 15, further comprising:

storing second data in the nonvolatile memory;

performing a first transmission of a second write request to the memory system, the second write request being associated with the second data;

storing second management data in the nonvolatile memory, the second management data including information equivalent to the second write request;

in response to receiving, from the memory system, a third response to the second write request transmitted in the first transmission, adding, to the second management data, information indicating that the third response to the second write request transmitted in the first transmission has been received; and deleting the second data and the second management data from the nonvolatile memory in response to receiving, from the memory system, a fourth response to the second write request transmitted in the first transmission after receiving the third response.

19. The method according to claim 18, further comprising:

storing, in the nonvolatile memory, information indicating an order of receiving the first response to the first write request transmitted in the first transmission and the third response to the second write request transmitted in the first transmission.

20. The method according to claim 15, further comprising:

locking the first data so that a storage area in the nonvolatile memory in which the first data is stored is not released, and then performing the first transmission of the first write request to the memory system; and unlocking the first data in response to receiving, from the memory system, the second response to the first write request transmitted in the first transmission.

* * * * *